US012210687B2

(12) United States Patent
Wu et al.

(10) Patent No.: US 12,210,687 B2
(45) Date of Patent: Jan. 28, 2025

(54) GESTURE RECOGNITION METHOD, ELECTRONIC DEVICE, COMPUTER-READABLE STORAGE MEDIUM, AND CHIP

(71) Applicant: HUAWEI TECHNOLOGIES CO., LTD., Guangdong (CN)

(72) Inventors: Xiaofei Wu, Shenzhen (CN); Fei Huang, Shenzhen (CN); Songcen Xu, Shenzhen (CN); Youliang Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 394 days.

(21) Appl. No.: 17/689,630

(22) Filed: Mar. 8, 2022

(65) Prior Publication Data

US 2022/0198836 A1    Jun. 23, 2022

Related U.S. Application Data

(63) Continuation of application No. PCT/CN2020/114501, filed on Sep. 10, 2020.

(30) Foreign Application Priority Data

Sep. 11, 2019  (CN) .......................... 201910859653.8

(51) Int. Cl.
*G06V 40/20*  (2022.01)
*G06F 3/01*   (2006.01)
(Continued)

(52) U.S. Cl.
CPC .............. *G06F 3/017* (2013.01); *G06V 10/74* (2022.01); *G06V 10/82* (2022.01); *G06V 20/20* (2022.01);
(Continued)

(58) Field of Classification Search
None
See application file for complete search history.

(56) References Cited

U.S. PATENT DOCUMENTS 8,781,221 B2    7/2014  Ding et al.
10,331,746 B1 *  6/2019  Ledet ................. G06F 16/9535
(Continued)

FOREIGN PATENT DOCUMENTS

CN     103208002 A    7/2013
CN     103366188 A   10/2013
(Continued)

OTHER PUBLICATIONS

PCT International Search Report and Written Opinion issued in International Application No. PCT/CN2020/114501 on Nov. 30, 2020, 16 pages (with English translation).
(Continued)

*Primary Examiner* — Thomas D Lee
(74) *Attorney, Agent, or Firm* — Fish & Richardson P.C.

(57) ABSTRACT

The disclosure provides gesture recognition methods and apparatuses, and relate to the field of artificial intelligence. One example gesture recognition method includes obtaining an image stream, and determining, based on a plurality of consecutive frames of hand images in the image stream, whether a user makes a preparatory action. When the user makes the preparatory action, continuing to obtain an image stream, and determining a gesture action of the user based on a plurality of consecutive frames of hand images in the continuously obtained image stream. Next, further responding to the gesture action to implement gesture interaction with the user. In this application, in order to reduce the erroneous recognition occurring in a gesture recognition process, the preparatory action is determined before gesture recognition is performed.

18 Claims, 13 Drawing Sheets

(51) Int. Cl.
*G06V 10/74* (2022.01)
*G06V 10/82* (2022.01)
*G06V 20/20* (2022.01)
*G06V 40/10* (2022.01)

(52) U.S. Cl.
CPC ............ *G06V 40/107* (2022.01); *G06V 40/11* (2022.01); *G06V 40/28* (2022.01)

(56) References Cited

U.S. PATENT DOCUMENTS

| | | | |
|---|---|---|---|
| 2007/0283296 A1* | 12/2007 | Nilsson | G06F 3/017 715/863 |
| 2009/0103780 A1 | 4/2009 | Nishihara et al. | |
| 2018/0024643 A1 | 1/2018 | Katz et al. | |
| 2019/0004615 A1 | 1/2019 | Shigeta | |

FOREIGN PATENT DOCUMENTS

| | | |
|---|---|---|
| CN | 103577075 A | 2/2014 |
| CN | 104793744 A | 7/2015 |
| CN | 104866083 A | 8/2015 |
| CN | 106095081 A | 11/2016 |
| CN | 108028891 A | 5/2018 |
| CN | 109558855 A | 4/2019 |
| CN | 109857245 A | 6/2019 |
| EP | 2650754 A2 | 10/2013 |
| WO | 2017113407 A1 | 7/2017 |

OTHER PUBLICATIONS

Extended European Search Report in European Appln No. 20863972.4, dated Sep. 30, 2022, 8 pages.

* cited by examiner

GESTURE RECOGNITION METHOD, ELECTRONIC DEVICE, COMPUTER-READABLE STORAGE MEDIUM, AND CHIP

CROSS-REFERENCE TO RELATED APPLICATIONS

This application is a continuation of International Application No. PCT/CN2020/114501, filed on Sep. 10, 2020, which claims priority to Chinese Patent Application No. 201910859653.8, filed on Sep. 11, 2019. The disclosures of the aforementioned applications are hereby incorporated by reference in their entireties.

TECHNICAL FIELD

This application relates to the field of human-computer interaction, and more specifically, to a gesture recognition method, an electronic device, and a computer-readable storage medium.

BACKGROUND

Computer vision is an integral part of various intelligent/ autonomic systems in various application fields, such as manufacturing industry, inspection, document analysis, medical diagnosis, and military affairs. The computer vision is knowledge about how to use a camera/video camera and a computer to obtain required data and information of a photographed subject. To be vivid, eyes (the camera/video camera) and a brain (an algorithm) are mounted on the computer to replace human eyes to recognize, track, and measure a target, so that the computer can perceive an environment. The perceiving may be considered as extracting information from a perceptual signal. Therefore, the computer vision may also be considered as a science of studying how to enable an artificial system to perform "perceiving" in an image or multi-dimensional data. Generally, the computer vision uses various imaging systems to obtain input information in place of visual organs, and then the computer processes and explains the input information in place of a brain. An ultimate study objective of the computer vision is to enable the computer to observe and understand the world through vision in a way that human beings do, and to have a capability of autonomously adapting to the environment.

In the field of computer vision, gesture recognition is a very important human-computer interaction manner. A gesture can express rich information in a non-contact manner, so that gesture recognition is widely used in products such as human-computer interaction, a smartphone, a smart television, smart wear, augmented reality (augmented reality, AR), and virtual reality (virtual reality, VR). In particular, in a gesture recognition method based on visual information, an additional sensor does not need to be worn on a hand to add a mark, and therefore the method is highly convenient and has a wide application prospect in human-computer interaction and another aspect.

However, due to universal existence of external interference and an operation habit of a user, erroneous detection relatively frequently occurs in a gesture recognition process, which causes poor experience of gesture interaction.

To reduce external interference in the gesture recognition process, a hierarchical structure is proposed in an existing solution to process a video stream. In the solution, a gesture detector and a gesture classifier are mainly used in the gesture recognition process to implement a gesture. The gesture detector uses a lightweight neural network to detect whether a gesture occurs. When the gesture detector detects that a gesture occurs, the gesture classifier further recognizes a type of the gesture, to obtain a gesture recognition result.

The foregoing solution mainly relies on a gesture classification detector to recognize a gesture action and a non-gesture action. However, when a gesture is classified by using the gesture classifier, some similar gesture actions made by a user cannot be well distinguished, which causes erroneous detection of a gesture.

SUMMARY

This application provides a gesture recognition method, an electronic device, a computer-readable storage medium, and a chip, to improve a gesture recognition effect.

According to a first aspect, a gesture recognition method is provided, and the method includes: obtaining a first image stream; determining, based on the first image stream, whether a user makes a preparatory action; obtaining a second image stream when the user makes the preparatory action; performing gesture recognition based on the second image stream to determine a gesture action of the user; and responding to the gesture action of the user to implement gesture interaction with the user.

The first image stream includes a plurality of consecutive frames of hand images of the user, and the second image stream also includes a plurality of consecutive frames of hand images of the user.

It should be understood that the plurality of consecutive frames of hand images of the user in the second image stream are different from the plurality of consecutive frames of hand images of the user in the first image stream, and obtaining time of the plurality of consecutive frames of hand images of the user in the second image stream is later than that of the plurality of consecutive frames of hand images of the user in the first image stream. Specifically, the plurality of consecutive frames of hand images of the user in the second image stream are obtained after it is determined, based on the plurality of consecutive frames of hand images of the user in the first image stream, that the user makes the preparatory action.

The preparatory action may be a preparation action before the user makes the gesture action. Further, the preparatory action may be a habitual preparation action or a natural preparation action before the user makes the gesture action.

Specifically, the preparatory action may be a habitual preparation action or a natural preparation action before the user makes the gesture action (these gesture actions may be some specific actions capable of performing gesture interaction with an electronic device, for example, screen capturing, waving up, and waving down), rather than an action intentionally made.

The preparatory action may be specifically a hover or a pause in any gesture posture.

For example, the preparatory action may be a hover or a pause when a hand is in an extended posture (the hand may be parallel or perpendicular to a screen of an electronic device after extending), may be a hover or a pause when a hand is in a fist clenching posture, or may be a hover or a pause when a hand is in a half-clenching posture.

The preparatory action may alternatively be an action in which four fingers (four fingers other than an index finger) of a hand curl up and the index finger stretches out, and the index finger taps or shakes in a small range.

In this application, the preparatory action is determined before gesture recognition is formally performed, and gesture recognition is performed only when the user makes the preparatory action, so that a start state of the gesture action can be accurately recognized to avoid an erroneous response to gesture recognition as much as possible, thereby increasing an accuracy rate of gesture recognition, and enhancing gesture interaction experience of the user.

The gesture action may be a mid-air gesture action. Specifically, when the method is performed by an electronic device, the user has no physical contact with the electronic device when making the gesture action.

The first image stream may also be referred to as a first video stream, and the second image stream may also be referred to as a second video stream.

With reference to the first aspect, in some implementations of the first aspect, the performing gesture recognition based on the second image stream to determine a gesture action of the user includes: performing gesture recognition on the second image stream to determine a first candidate gesture action and a second candidate gesture action that occur successively; and when the first candidate gesture action is a gesture action made before the user makes the second candidate gesture action, determining the second candidate gesture action as the gesture action of the user.

Optionally, the first candidate gesture action is a gesture action habitually made before the user makes the second candidate gesture action.

In this application, when two candidate gesture actions that occur consecutively are recognized based on an image stream, a gesture action really made by the user may be comprehensively determined based on whether a previous candidate gesture action is a gesture action made before the user makes a subsequent candidate gesture action, to avoid erroneous recognition of the gesture action to a specific extent, thereby increasing an accuracy rate of gesture action recognition.

With reference to the first aspect, in some implementations of the first aspect, the second candidate gesture action is a screen capture action, and the first candidate gesture action is any of pushing forward, pushing backward, waving up, and waving down.

With reference to the first aspect, in some implementations of the first aspect, the performing gesture recognition based on the second image stream to determine a gesture action of the user includes: determining a hand posture type of the user based on any frame of hand image in the first N (N is a positive integer) frames of images in the plurality of consecutive frames of hand images in the second image stream; determining a third candidate gesture action of the user based on a stream of the plurality of consecutive frames of hand images in the second image stream; determining, based on a preset matching rule, whether the hand posture type of the user matches a third candidate gesture action; and when the hand posture type of the user matches the third candidate gesture action, determining the third candidate gesture action as the gesture action of the user.

In this application, the hand posture type of the user and the third candidate gesture action of the user are determined by using the second image stream, and whether the third candidate gesture action of the user is the gesture action of the user is determined based on whether the hand posture type of the user matches the third candidate gesture action of the user, to avoid erroneous gesture recognition to a specific extent, thereby increasing an accuracy rate of gesture recognition.

With reference to the first aspect, in some implementations of the first aspect, the determining, based on a preset rule, whether the hand posture type of the user matches the candidate gesture action of the user includes: when the hand posture type of the user is placed horizontally and the third candidate gesture action is paging up and down, determining that the hand posture type of the user matches the third candidate gesture action; and when the hand posture type of the user is placed vertically and the third candidate gesture action is paging left and right, determining that the hand posture type of the user matches the third candidate gesture action of the user.

That the hand posture type of the user is placed horizontally may mean that a plane on which a hand of the user is located is parallel to a horizontal plane, or may mean that an angle between the plane on which the hand of the user is located and the horizontal plane falls within a preset range. The preset range of the angle herein may be set based on experience. For example, that the hand posture type of the user is placed horizontally may mean that the angle between the plane on which the hand of the user is located and the horizontal plane ranges from 0 degrees to 30 degrees.

In addition, that the hand posture type of the user is placed vertically may mean that the plane on which the hand of the user is located is perpendicular to the horizontal plane, or may mean that the angle between the plane on which the hand of the user is located and the horizontal plane falls within a preset range. The preset range of the angle herein may also be set based on experience. For example, that the hand posture type of the user is placed vertically may mean that the angle between the plane on which the hand of the user is located and the horizontal plane ranges from 60 degrees to 90 degrees.

The preset rule may be a predetermined matching rule. The preset rule includes a plurality of hand posture types of the user and gesture actions matching the plurality of hand posture types. In other words, the preset rule includes a plurality of pairs of matched information, and each pair of matched information includes a hand posture type and a gesture action matching the hand posture type.

With reference to the first aspect, in some implementations of the first aspect, the preparatory action is a hover in any gesture posture.

With reference to the first aspect, in some implementations of the first aspect, the determining, based on the first image stream, whether a user makes a preparatory action includes: detecting the first image stream to obtain a hand bounding box in each of the plurality of frames of images in the first image stream, where the hand bounding box in each frame of image is a surrounding box surrounding a hand of the user in the frame of image; and when a degree of overlapping between the hand bounding boxes in the plurality of frames of images is greater than a preset threshold, determining that the user makes the preparatory action.

With reference to the first aspect, in some implementations of the first aspect, the method further includes: prompting the user to make the preparatory action before making the gesture action.

In this application, the user is prompted to make the preparatory action before making the gesture action, so that the user can be prevented from forgetting to make the preparatory action when gesture recognition is performed, thereby improving a gesture recognition effect to a specific extent, and improving interaction experience of the user.

Optionally, the method further includes: presenting preparatory action prompt information, where the preparatory action prompt information is used to prompt the user to make the preparatory action before making the gesture action.

The preparatory action prompt information may be prompt information in a text form, may be prompt information in a voice form, may be picture information, or may be information in combination with at least two of the three forms. For example, the preparatory action prompt information may include a corresponding text prompt and voice prompt.

The preparatory action prompt information may be presented by using a screen when including image and text information, the preparatory action may be presented by using a speaker when including voice information, or the preparatory action prompt information may be jointly presented by using the screen and the speaker when including both the image and text information and the voice information.

The user can be better prompted by using the preparatory action prompt information, so that the user makes the preparatory action before making the gesture action, thereby improving a gesture recognition effect to a specific extent, and improving user experience.

With reference to the first aspect, in some implementations of the first aspect, the method further includes: obtaining preparatory action selection information of the user, where the preparatory action selection information is used to indicate the preparatory action; and determining the preparatory action based on the preparatory action selection information.

In this application, the preparatory action is determined by using the preparatory action selection information of the user. Compared with a manner in which a uniform preparatory action is used, a proper preparatory action can be selected for the user based on an operation habit of the user, thereby improving user experience.

According to a second aspect, an electronic device is provided, and the electronic device includes a module configured to perform the method in any of the implementations of the first aspect.

According to a third aspect, an electronic device is provided. The electronic device includes: a memory, configured to store a program; and a processor, configured to execute the program stored in the memory. When the program stored in the memory is executed, the processor is configured to perform the method in any of the implementations of the first aspect.

According to a fourth aspect, a computer-readable medium is provided. The computer-readable medium stores program code to be executed by a device, and the program code includes instructions used to perform the method in any implementation of the first aspect.

According to a fifth aspect, a computer program product including instructions is provided. When the computer program product is run on a computer, the computer is enabled to perform the method in any implementation of the first aspect.

According to a sixth aspect, a chip is provided. The chip includes a processor and a data interface. The processor reads, through the data interface, instructions stored in a memory, to perform the method in any implementation of the first aspect.

Optionally, in an implementation, the chip may further include a memory. The memory stores instructions. The processor is configured to execute the instructions stored in the memory. When the instructions are executed, the processor is configured to perform the method in any implementation of the first aspect.

DESCRIPTION OF EMBODIMENTS

The following describes the technical solutions in embodiments of this application with reference to the accompanying drawings in the embodiments of this application.

Figure 1:
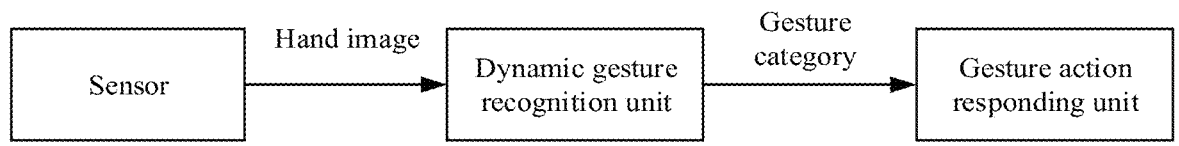
FIG. 1 is a schematic diagram of a gesture interaction system according to an embodiment of this application.

FIG. 1 is a schematic diagram of a gesture interaction system according to an embodiment of this application.

As shown in FIG. 1, a typical gesture interaction system includes a sensor, a dynamic gesture recognition unit, and a gesture action responding unit. The sensor may be specifically a camera (for example, a color camera, a grayscale camera, a depth camera, or the like), and image information including a hand image stream (which may be specifically information about consecutive frames of images in the hand image stream) may be obtained by using the sensor. Next, the dynamic gesture recognition unit may process the image information including the hand image stream, and recognize a hand action in the image information as a predefined gesture category. Finally, a gesture action system responds (for example, photographing or playing music) to the gesture category recognized by the dynamic gesture recognition system, to implement gesture interaction.

In addition, the gesture interaction system shown in FIG. 1 may be a dynamic gesture interaction system. Generally, the dynamic gesture recognition system responds only to a single action of a user and does not respond to a plurality of consecutive actions, to avoid confusion between different action responses.

The solutions of this application may be applied to gesture interaction in an electronic device and a gesture interaction scenario in an in-vehicle system. Specifically, the electronic device may specifically include a smartphone, a personal digital assistant (personal digital assistant, PDA), a tablet computer, and the like.

Two relatively common application scenarios are briefly described below.

Application Scenario 1: Gesture Interaction in a Smartphone

In a gesture interaction scenario of the smartphone, through gesture recognition, the smartphone can be operated simply, naturally, and conveniently, and even a touchscreen can be replaced with gesture interaction. Specifically, the smartphone may use a camera or another peripheral camera as an image sensor to obtain image information including a hand image stream; process the image information including the hand image stream by using an operation unit, to obtain gesture recognition information; and then report the gesture recognition information to an operating system, to be responded. Through gesture recognition, functions such as paging up and down, audio and video play, volume control, reading, and browsing may be implemented, which greatly improves a technology sense of the smartphone and interaction convenience.

Application Scenario 2: Gesture Interaction in an In-Vehicle System

Another important application scenario of gesture recognition is gesture interaction in the in-vehicle system. In the in-vehicle system, through gesture interaction, functions such as music play and volume adjustment in a vehicle can be implemented simply by making a specific gesture, which can improve interaction experience of the in-vehicle system.

Specifically, in the in-vehicle system, an image sensor may be used to collect data to obtain image information including a hand image stream, then an operation unit is used to perform gesture recognition on the image information including the hand image stream, and finally, a detected gesture is responded to in the in-vehicle system and an application, to implement gesture interaction.

In the solutions of this application, a neural network (model) may be used for gesture recognition. To better understand the solutions of this application, terms and concepts related to the neural network are first described below.

(1) Neural Network

The neural network may include a neural unit. The neural unit may be an operation unit that uses $x_s$ and an intercept 1 as an input, and an output of the operation unit may be shown in formula (1):

$$h_{W,b}(x) = f(W^T x) = f(\Sigma_{s=1}^{n} W_s x_s + b) \quad (1)$$

Herein, s=1, 2, . . . , n, n is a natural number greater than $W_s$ represents a weight of $x_s$, b represents a bias of the neuron, and f is an activation function (activation functions) of the neural unit, and the activation function is used to perform non-linear transformation on a feature in the neural network, to convert an input signal in the neural unit into an output signal. The output signal of the activation function may be used as input of a next convolutional layer, and the activation function may be a sigmoid function. The neural network is a network constituted by connecting a plurality of single neurons together. To be specific, output of a neuron may be input of another neuron. Input of each neuron may be connected to a local receptive field of a previous layer to extract a feature of the local receptive field. The local receptive field may be a region including several neurons.

(2) Deep Neural Network

The deep neural network (deep neural network, DNN) is also referred to as a multi-layer neural network, and may be understood as a neural network having a plurality of hidden layers. The DNN is divided based on positions of different layers. Neural networks inside the DNN may be classified into three types: an input layer, a hidden layer, and an output layer. Generally, the first layer is the input layer, the last layer is the output layer, and the middle layer is the hidden layer. Layers are fully connected. To be specific, any neuron in an $i^{th}$ layer is necessarily connected to any neuron in an $(i+1)^{th}$ layer.

Although the DNN seems complex, the DNN is actually not complex in terms of work at each layer, and is simply represented as the following linear relationship expression: $\vec{y} = \alpha(W \cdot \vec{x} \alpha b)$, where $\vec{x}$ is an input vector, $\vec{y}$ is an output vector, $\vec{b}$ is a bias vector, W is a weight matrix (which is also referred to as a coefficient), and $\alpha()$ is an activation function. At each layer, the output vector $\vec{y}$ is obtained by performing such a simple operation on the input vector $\vec{x}$. Due to a large quantity of DNN layers, quantities of coefficients W and bias vectors $\vec{b}$ are also large. Definitions of the parameters in the DNN are as follows: The coefficient W is used as an example. It is assumed that in a DNN with three layers, a linear coefficient from the fourth neuron at the second layer to the second neuron at the third layer is defined as $W_{24}^{3}$. A superscript 3 represents a number of a layer in which the coefficient W is located, and a subscript corresponds to an index 2 of the third layer for output and an index 4 of the second layer for input.

In conclusion, a coefficient from a $k^{th}$ neuron at an $(L-1)^{th}$ layer to a $j^{th}$ neuron at an $L^{th}$ layer is defined as $W_{jk}^{L}$.

It should be noted that the input layer has no parameter W. In the deep neural network, more hidden layers make the network more capable of describing a complex case in the real world. Theoretically, a model with more parameters has higher complexity and a larger "capacity". It indicates that the model can complete a more complex learning task. Training of the deep neural network is a process of learning a weight matrix, and a final objective of the training is to obtain a weight matrix of all layers of a trained deep neural network (a weight matrix formed by vectors W of many layers).

(3) Convolutional Neural Network

The convolutional neural network (convolutional neuron network, CNN) is a deep neural network with a convolutional structure. The convolutional neural network includes a feature extractor including a convolutional layer and a sub-sampling layer. The feature extractor may be considered as a filter. The convolutional layer is a neuron layer that performs convolution processing on an input signal that is in the convolutional neural network. In the convolutional layer of the convolutional neural network, one neuron may be connected to only a part of neurons in a neighboring layer. A convolutional layer generally includes several feature planes, and each feature plane may include some neurons arranged in a rectangle. Neurons of a same feature plane share a weight, and the shared weight herein is a convolution kernel. Sharing the weight may be understood as that a manner of extracting image information is unrelated to a position. The convolution kernel may be initialized in a form of a matrix of a random size. In a training process of the convolutional neural network, an appropriate weight may be obtained for the convolution kernel through learning. In addition, sharing the weight is advantageous because connections between layers of the convolutional neural network are reduced, and a risk of overfitting is reduced.

(4) Residual Network

The residual network is a deep convolutional network proposed in 2015. Compared with a conventional convolutional neural network, the residual network is easier to optimize, and a comparable depth can be added to increase an accuracy rate. A core of the residual network is to resolve a side effect (a degradation problem) brought by a depth increase. In this way, network performance can be improved simply by increasing a network depth. The residual network usually includes many submodules with a same structure, and a quantity of repetitions of a submodule is usually indicated by connecting the residual network (residual network, ResNet) to a number, for example, ResNet50 indicates that there are 50 submodules in the residual network.

(6) Classifier

Many neural network structures have a classifier in the last, and the classifier is configured to classify objects in an image. The classifier usually includes a fully connected layer (fully connected layer) and a softmax function (which may be referred to as a normalized exponential function), and can output probabilities of different categories based on an input.

(7) Loss Function

In a process of training a deep neural network, because it is expected that an output of the deep neural network is as close as possible to a value that is actually expected to be predicted, a predicted value of a current network and a target value that is actually expected may be compared, and then, a weight vector of each layer of neural network is updated based on a difference between the two (certainly, there is usually an initialization process before the first update, that is, a parameter is preconfigured for each layer in the deep neural network). For example, if the predicted value of the network is higher, the weight vector is adjusted to obtain a lower predicted value. The weight vector is continuously adjusted until the deep neural network can predict the target value that is actually expected or a value that is very close to the target value that is actually expected. Therefore, "how to obtain, through comparison, the difference between the predicted value and the target value" needs to be predefined. This is the loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(8) Back Propagation Algorithm

The neural network may correct a value of a parameter in an initial neural network model in a training process by using an error back propagation (back propagation, BP) algorithm, so that an error loss of reconstructing the neural network model becomes small. Specifically, an input signal is forward transferred until an error loss occurs in output, and the parameters in the initial neural network model are updated based on back propagation error loss information, so that the error loss is reduced. The back propagation algorithm is a back propagation motion mainly dependent on the error loss, and aims to obtain parameters of an optimal neural network model, for example, a weight matrix.

Some basic content of the neural network is briefly described above, and some specific neural networks that may be used in image data processing are described below.

Figure 2:
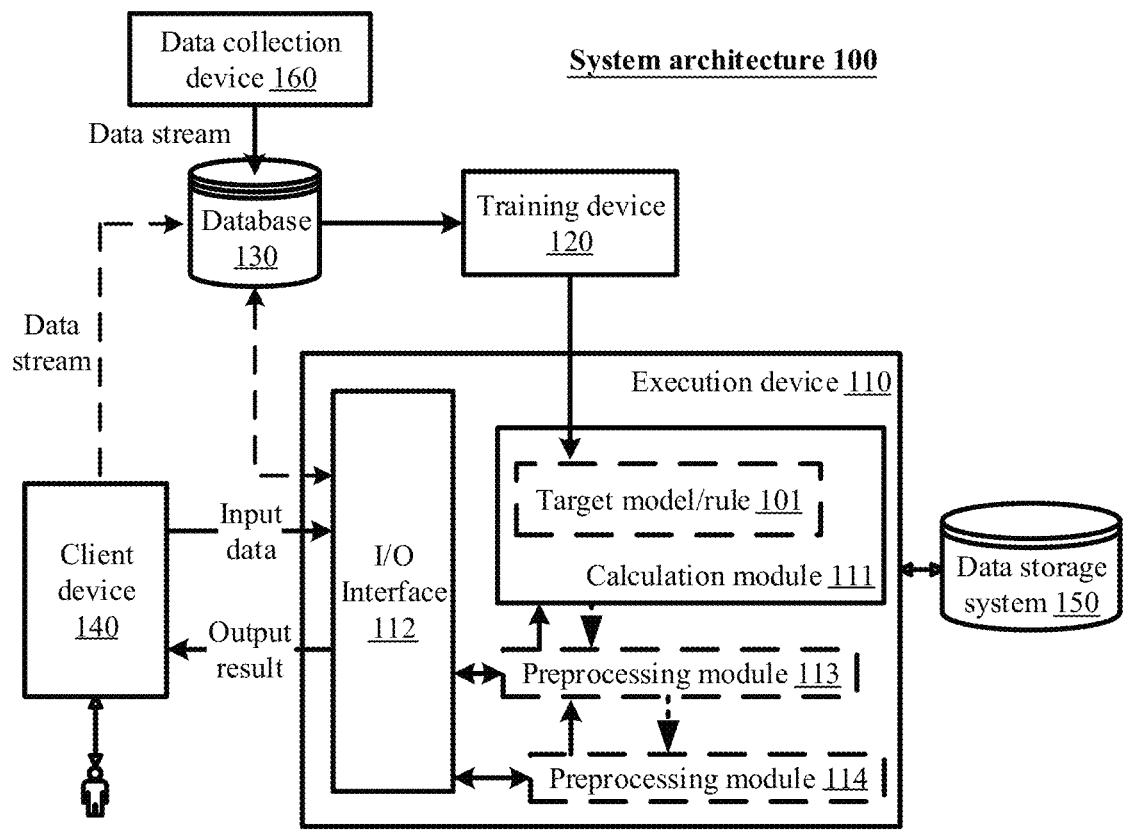
FIG. 2 is a schematic diagram of a system architecture according to an embodiment of this application.

The following describes in detail a system architecture in an embodiment of this application with reference to FIG. 2.

FIG. 2 is a schematic diagram of a system architecture according to an embodiment of this application. As shown in FIG. 2, the system architecture 100 includes an execution device 110, a training device 120, a database 130, a client device 140, a data storage system 150, and a data collection system 160.

In addition, the execution device 110 includes a calculation module 111, an I/O interface 112, a preprocessing module 113, and a preprocessing module 114. The calculation module 111 may include a target model/rule 101, and the preprocessing module 113 and the preprocessing module 114 are optional.

The data collection device 160 is configured to collect training data. After the training data is obtained, the target model/rule 101 may be trained based on the training data. Next, the target model/rule 101 obtained through learning may be used to perform a related process of a gesture recognition method in the embodiments of this application.

The target model/rule 101 may include a plurality of neural network submodels, and each neural network submodel is configured to perform a corresponding recognition process.

Specifically, the target model/rule 101 may include a first neural network submodel, a second neural network submodel, and a third neural network submodel, and functions of the three neural network submodels are described below.

The first neural network submodel is configured to detect an image stream to determine a hand bounding box in each frame of image in the image stream.

The second neural network submodel is configured to perform gesture recognition on the image stream to determine a gesture action of a user.

The third neural network submodel is configured to recognize a frame of image to determine a hand posture type of the user.

The three neural network submodels may be separately obtained through separate training.

The first neural network submodel may be obtained through training by using a first type of training data. The first type of training data includes a plurality of frames of hand images and labeled data of the plurality of frames of hand images, and the labeled data of the plurality of frames of hand images includes a surrounding box in which a hand in each frame of hand image is located.

The second neural network submodel may be obtained through training by using a second type of training data. The second type of training data includes a plurality of image streams and labeled data of the plurality of image streams, each of the plurality of image streams includes a plurality of consecutive frames of hand images, and the labeled data of the plurality of image streams includes a gesture action corresponding to each image stream.

The third neural network submodel may be obtained through training by using a third type of training data. The third type of training data includes a plurality of frames of hand images and labeled data of the plurality of frames of images, and the labeled data of the plurality of frames of images includes a gesture posture corresponding to each frame of image.

The target model/rule 101 obtained through training by the training device 120 may be applied to different systems or devices, for example, an execution device 110 shown in FIG. 2. The execution device 110 may be a terminal, for example, a mobile phone terminal, a tablet computer, a laptop computer, an augmented reality (augmented reality, AR)/virtual reality (virtual reality, VR) terminal, or a vehicle-mounted terminal, or may be a server, a cloud, or the like. In FIG. 2, the input/output (input/output, I/O) interface 112 is configured in the execution device 110, to exchange data with an external device. A user may input data to the I/O interface 112 by using the client device 140. In this embodiment of this application, the input data may include a to-be-processed image input by the client device. The client device 140 herein may be specifically a terminal device.

The preprocessing module 113 and the preprocessing module 114 are configured to perform preprocessing based on input data (for example, a to-be-processed image) received by the I/O interface 112. In this embodiment of this application, there may be only one or neither of the preprocessing module 113 and the preprocessing module 114. When the preprocessing module 113 and the preprocessing module 114 do not exist, the input data may be directly processed by using the calculation module 111.

In a related processing process such as a process in which the execution device 110 preprocesses the input data or the calculation module 111 of the execution device 110 performs computing, the execution device 110 may invoke data, code, and the like in the data storage system 150 for corresponding processing, and may store, in the data storage system 150, data, an instruction, and the like that are obtained through corresponding processing.

It should be noted that FIG. 2 is merely a schematic diagram of a system architecture according to an embodiment of this application. A position relationship between a device, a component, a module, and the like shown in the figure constitutes no limitation. For example, in FIG. 2, the data storage system 150 is an external memory relative to the execution device 110. In another case, the data storage system 150 may alternatively be configured in the execution device 110.

As shown in FIG. 2, the target model/rule 101 obtained through training based on the training device 120 may be a neural network in the embodiments of this application. Specifically, the neural network provided in the embodiments of this application may be a CNN, a deep convolutional neural network (deep convolutional neural networks, DCNN), or the like.

Because the CNN is a very common neural network, a structure of the CNN is described below in detail with reference to FIG. 3. As described in the foregoing basic concept description, the convolutional neural network is a deep neural network with a convolutional structure, and is a deep learning (deep learning) architecture. The deep learning architecture means performing multi-level learning at different abstract levels by using a machine learning algorithm. As a deep learning architecture, the CNN is a feed-forward (feed-forward) artificial neural network, and each neuron in the feed-forward artificial neural network can respond to an image input into the feed-forward artificial neural network.

Figure 3:
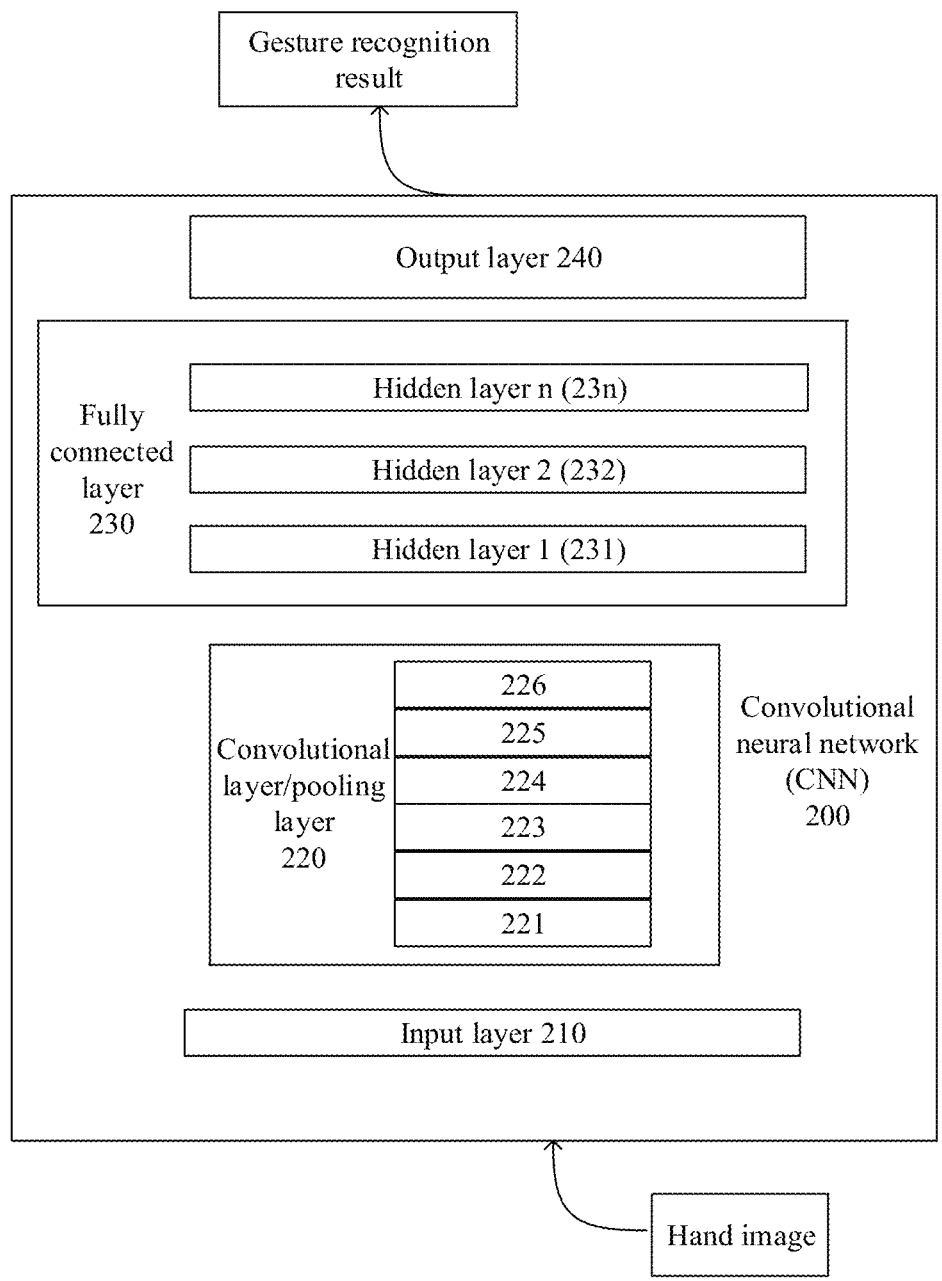
FIG. 3 is a schematic diagram of gesture recognition performed by using a convolutional neural network model provided in an embodiment of this application.

As shown in FIG. 3, a convolutional neural network (CNN) 200 may include an input layer 210, a convolutional layer/pooling layer 220 (the pooling layer is optional), and a fully connected layer (fully connected layer) 230. The following describes related content of these layers in detail.

Convolutional Layer/Pooling Layer 220:

As shown in FIG. 3, the convolutional layer/pooling layer 220 may include, for example, layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer; and in another implementation, the layers 221 and 222 are convolutional layers, the layer 223 is a pooling layer, the layers 224 and 225 are convolutional layers, and the layer 226 is a pooling layer. In other words, an output of a convolutional layer may be used as an input of a subsequent pooling layer, or may be used as an input of another convolutional layer to continue to perform a convolution operation.

The following describes an internal working principle of a convolutional layer by using the convolutional layer 221 as an example.

The convolutional layer 221 may include a plurality of convolution operators. The convolution operator is also referred to as a kernel, and functions in image processing like a filter for extracting particular information from an input image matrix. The convolution operator may be essentially a weight matrix, and the weight matrix is usually predefined. In a process of performing a convolution operation on an image, a weight matrix usually performs processing in a horizontal direction of one pixel after another pixel (or two pixels after two other pixels . . . , which depends on a value of a stride (stride)) on an input image, to complete extraction of a particular feature from the image. A size of the weight matrix should be related to a size of the image. It should be noted that a depth dimension (depth dimension) of the weight matrix is the same as a depth dimension of the input image. In the convolution operation process, the weight matrix extends to an entire depth of the input image. Therefore, convolution with a single weight matrix generates a convolution output of a single depth dimension. However, in most cases, the single weight matrix is not used, but instead, a plurality of weight matrices of a same size (rows×columns), namely, a plurality of homogeneous matrices, are used. Outputs of all the weight matrices are stacked to form a depth dimension of a convolutional image. The dimension herein may be understood as being determined by the "plurality of" described above. Different weight matrices may be used to extract different features in an image. For example, one weight matrix is used to extract edge information of the image, another weight matrix is used to extract a particular color of the image, and still another weight matrix is used to blur unwanted noise in the image. Sizes (rows×columns) of the plurality of weight matrices are the same, and sizes of convolutional feature maps obtained through extraction based on the plurality of weight matrices of the same size are also the same. Then, the plurality of extracted convolutional feature maps of the same size are combined to form an output of a convolution operation.

Weight values in these weight matrices need to be obtained through a large amount of training in actual application. Each weight matrix including weight values obtained through training may be used to extract information from an input image, so that the convolutional neural network 200 performs correct prediction.

When the convolutional neural network 200 has a plurality of convolutional layers, an initial convolutional layer (for example, 221) usually extracts a relatively large quantity of general features. The general features may also be referred to as low-level features. With deepening of the convolutional neural network 200, a later convolutional layer (for example, 226) extracts a more complex feature, for example, a high-level feature such as a semantic feature. A feature with a higher semantic meaning is more applicable to a problem to be resolved.

Pooling Layer:

Because a quantity of training parameters usually needs to be reduced, a pooling layer usually needs to be periodically introduced behind a convolutional layer. For the layers 221 to 226 shown in 220 in FIG. 3, one convolutional layer may be followed by one pooling layer, or a plurality of convolutional layers may be followed by one or more pooling layers. In an image processing process, a sole purpose of the pooling layer is to reduce a space size of an image. The pooling layer may include an average pooling operator and/or a maximum pooling operator, to sample an input image to obtain an image of a relatively small size. The average pooling operator may calculate, within a particular range, an average value of pixel values in an image as a result of average pooling. The maximum pooling operator may obtain, within a particular range, a pixel with a maximum value in the range as a result of maximum pooling. In addition, just as a size of a weight matrix in the convolutional layer should be related to a size of an image, the operator in the pooling layer should also be related to a size of an image. A size of an image output after processing performed by the pooling layer may be less than a size of an image input to the pooling layer. Each pixel in the image output by the pooling layer represents an average value or a maximum value of a corresponding sub-region of the image input to the pooling layer.

Fully Connected Layer 230:

After processing is performed by the convolutional layer/pooling layer 220, the convolutional neural network 200 still cannot output required output information. As described above, the convolutional layer/pooling layer 220 only extracts a feature and reduces parameters brought by an input image. However, to generate final output information (required category information or other related information), the convolutional neural network 200 needs to use the fully connected layer 230 to generate a quantity of outputs of one or a set of required categories. Therefore, the fully connected layer 230 may include a plurality of hidden layers (231 and 232 to 23n shown in FIG. 3) and an output layer 240. Parameters included in the plurality of hidden layers may be obtained through pre-training based on related training data of a specific task type. For example, the task type may include image recognition, image classification, or super-resolution image reconstruction.

The output layer 240 is behind the plurality of hidden layers in the fully connected layer 230, and is the last layer of the entire convolutional neural network 200. The output layer 240 has a loss function similar to classification cross entropy, and is specifically configured to calculate a prediction error. Once forward propagation (for example, in FIG. 3, propagation in a direction from 210 to 240 is forward propagation) of the entire convolutional neural network 200 is completed, back propagation (for example, in FIG. 3, propagation in a direction from 240 to 210 is back propagation) starts to update a weight value and a bias of each layer mentioned above, to reduce a loss of the convolutional neural network 200 and an error between a result output by the convolutional neural network 200 by using the output layer and an ideal result.

It should be noted that the convolutional neural network 200 shown in FIG. 3 is merely an example of a convolutional neural network, and in specific application, the convolutional neural network may alternatively exist in a form of another network model.

It should be understood that the convolutional neural network (CNN) 200 shown in FIG. 3 may be used to perform the gesture recognition method in the embodiments of this application. As shown in FIG. 3, a gesture recognition result may be obtained after a hand image stream is processed at the input layer 210, the convolutional layer/pool layer 220, and the fully connected layer 230.

Figure 4:
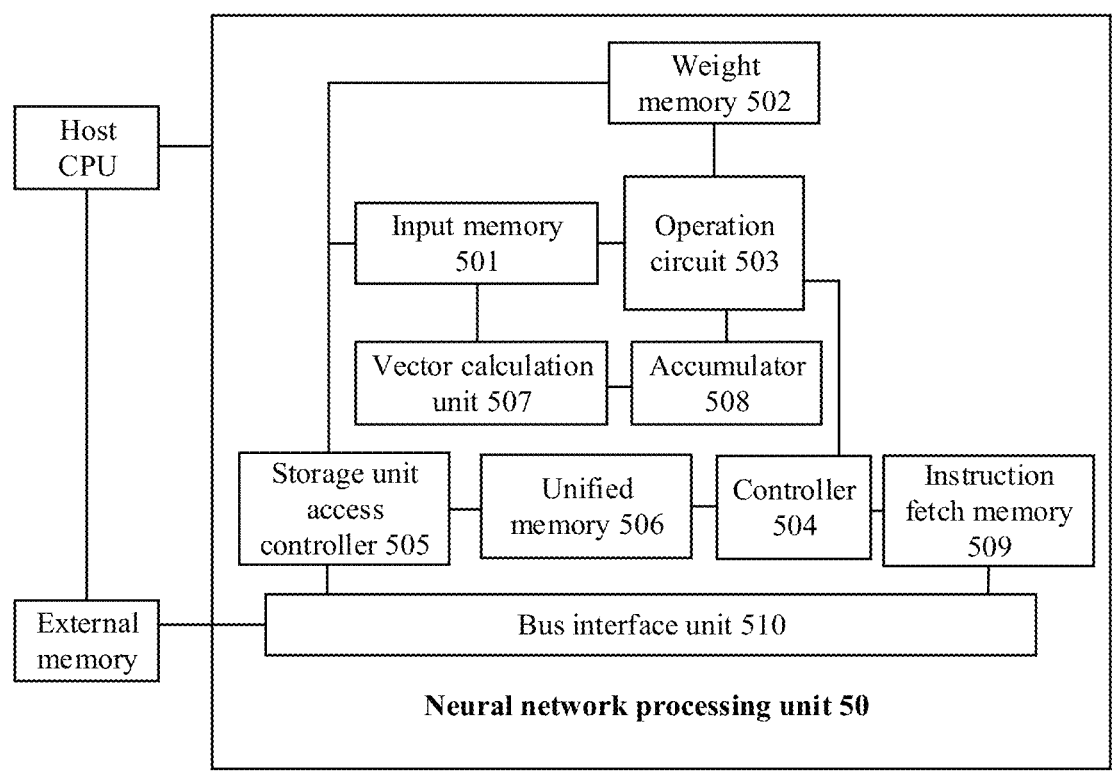
FIG. 4 is a schematic diagram of a hardware structure of a chip according to an embodiment of this application.

FIG. 4 shows a hardware structure of a chip according to an embodiment of this application, and the chip includes a neural network processing unit 50. The chip may be disposed in the execution device 110 shown in FIG. 2, to complete calculation work of the calculation module 111. The chip may be alternatively disposed in the training device 120 shown in FIG. 2, to complete training work of the training device 120 and output a target model/rule 101. All algorithms of the layers in the convolutional neural network shown in FIG. 3 may be implemented in the chip shown in FIG. 4.

The neural-network processing unit (neural-network processing unit, NPU) 50 is mounted to a host central processing unit (host central processing unit, Host CPU) (host CPU) as a coprocessor, and the host CPU allocates a task. A core part of the NPU is an operation circuit 503, and a controller 504 controls the operation circuit 503 to extract data in a memory (a weight memory or an input memory) and perform an operation.

In some implementations, the operation circuit 503 includes a plurality of processing units (process engine, PE) inside. In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit 503 obtains data corresponding to the matrix B from the weight memory 502, and buffers the data in each PE in the operation circuit 503. The operation circuit 503 obtains data of the matrix A from the input memory 501, performs a matrix operation on the matrix A and the matrix B, and stores an obtained partial result or final result of the matrices in an accumulator (accumulator) 508.

A vector calculation unit 507 may perform further processing such as vector multiplication, vector addition, an exponent operation, a logarithm operation, or value comparison on an output of the operation circuit 503. For example, the vector calculation unit 507 may be configured to perform network calculation, such as pooling (pooling), batch normalization (batch normalization), or local response normalization (local response normalization) at a non-convolutional/non-FC layer in a neural network.

In some implementations, the vector calculation unit 507 can store a processed output vector in a unified memory 506. For example, the vector calculation unit 507 can apply a non-linear function to an output of the operation circuit 503, for example, to a vector of an accumulated value, to generate an activated value. In some implementations, the vector calculation unit 507 generates a normalized value, a combined value, or both a normalized value and a combined value. In some implementations, the processed output vector can be used as an activated input to the operation circuit 503, for example, the processed output vector can be used at a subsequent layer of the neural network.

The unified memory 506 is configured to store input data and output data.

For weight data, a direct memory access controller (direct memory access controller, DMAC) 505 directly transfers input data in an external memory to the input memory 501 and/or the unified memory 506, stores weight data in the external memory in the weight memory 502, and stores data in the unified memory 506 in the external memory.

A bus interface unit (bus interface unit, BIU) 510 is configured to implement interaction between the host CPU, the DMAC, and an instruction fetch buffer 509 by using a bus.

The instruction fetch buffer (instruction fetch buffer) 509 connected to the controller 504 is configured to store instructions used by the controller 504.

The controller 504 is configured to invoke the instructions buffered in the instruction fetch buffer 509, to control a working process of an operation accelerator.

Usually, the unified memory 506, the input memory 501, the weight memory 502, and the instruction fetch buffer 509 each are an on-chip (on-chip) memory. The external memory is a memory outside the NPU. The external memory may be a double data rate synchronous dynamic random access memory (double data rate synchronous dynamic random access memory, DDR SDRAM for short), a high bandwidth memory (high bandwidth memory, HBM), or another readable and writable memory.

In addition, in this application, an operation at each layer in the convolutional neural network shown in FIG. 3 may be performed by the operation circuit 503 or the vector calculation unit 507.

Figure 5:
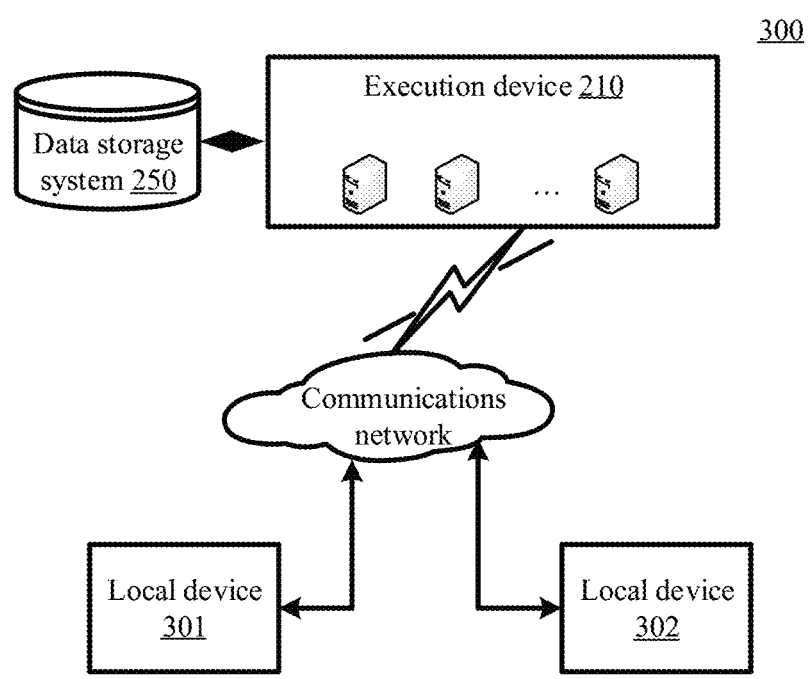
FIG. 5 is a schematic diagram of a system architecture according to an embodiment of this application.

As shown in FIG. 5, an embodiment of this application provides a system architecture 300. The system architecture includes a local device 301, a local device 302, an execution device 210, and a data storage system 250. The local device 301 and the local device 302 are connected to the execution device 210 by using a communications network.

The execution device 210 may be implemented by one or more servers. Optionally, the execution device 210 may cooperate with another computing device, for example, a device such as a data memory, a router, or a load balancer. The execution device 210 may be disposed on one physical site, or distributed on a plurality of physical sites. The execution device 210 may implement the gesture recognition method in the embodiments of this application by using data in the data storage system 250, or invoking program code in the data storage system 250.

A user may operate user equipment (for example, the local device 301 and the local device 302) to interact with the execution device 210. Each local device may be any computing device, such as a personal computer, a computer workstation, a smartphone, a tablet computer, an intelligent camera, a smart automobile, another type of cellular phone, a media consumption device, a wearable device, a set-top box, or a game console.

The local device of each user may interact with the execution device 210 through a communications network of any communications mechanism/communications standard. The communications network may be a wide area network, a local area network, a point-to-point connection, or any combination thereof.

In an implementation, the local device 301 and the local device 302 obtain a related parameter of the target neural network from the execution device 210, deploy the target neural network on the local device 301 and the local device 302, and perform gesture recognition by using the target neural network.

In another implementation, the target neural network may be directly deployed on the execution device 210. The execution device 210 obtains a to-be-processed image from the local device 301 and the local device 302 (the local device 301 and the local device 302 may upload the to-be-processed image to the execution device 210), performs gesture recognition on the to-be-processed image based on the target neural network, and sends a high-quality image obtained through gesture recognition to the local device 301 and the local device 302.

The execution device 210 may also be referred to as a cloud device. In this case, the execution device 210 is usually deployed on a cloud.

The gesture recognition method in the embodiments of this application is described below in detail with reference to the accompanying drawings.

Figure 6:
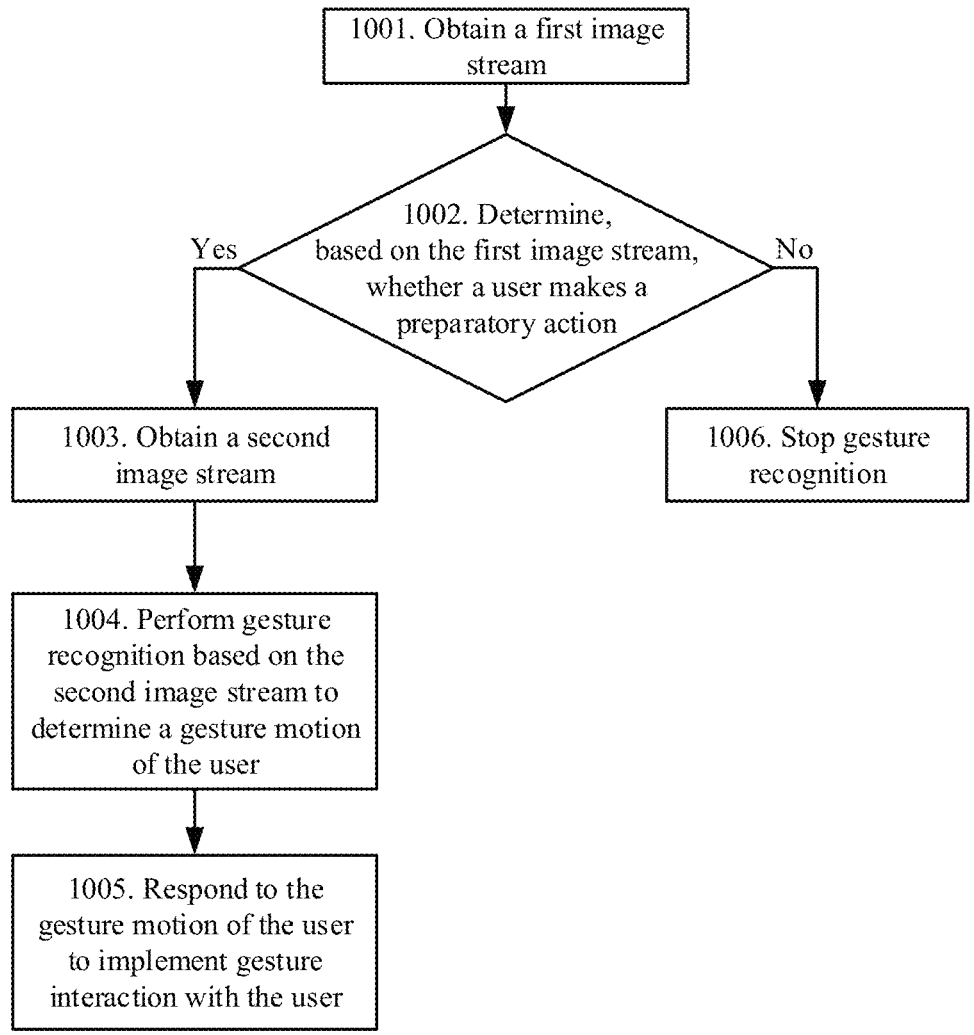
FIG. 6 is a flowchart of a gesture recognition method according to an embodiment of this application.

FIG. 6 is a flowchart of a gesture recognition method according to an embodiment of this application. The gesture recognition method shown in FIG. 6 may be performed by an electronic device. The electronic device may be a device that can obtain gesture image information, and the electronic device may specifically include a smartphone, a PDA, a tablet computer, and the like.

The gesture recognition method shown in FIG. 6 includes step 1001 to step 1006, and these steps are separately described below in detail.

1001. Obtain a First Image Stream.

The first image stream includes a plurality of consecutive frames of hand images of a user, and the first image stream may also be referred to as a first video stream.

In step 1001, the first image stream may be obtained by using a sensor of the electronic device. The sensor of the electronic device may be specifically a camera (for example, a color camera, a grayscale camera, or a depth camera).

When a hand of the user is located in front of the sensor of the electronic device, the first image stream including a hand image of the user may be obtained by using the sensor of the electronic device.

Figure 7:
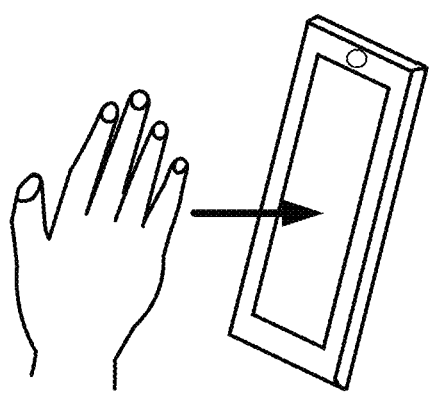
FIG. 7 is a schematic diagram of gesture interaction performed between a user and an electronic device.

For example, as shown in FIG. 7, when the hand of the user is located in front of a screen of the electronic device, the first image stream including the hand image of the user may be obtained by using a camera in front of the screen of the electronic device.

Optionally, before step 1001, the method shown in FIG. 6 further includes: prompting the user to make a preparatory action before making a gesture action.

The user is prompted to make the preparatory action before making the gesture action, so that the user can be prevented from forgetting the preparatory action when gesture recognition is performed, thereby improving interaction experience of the user to a specific extent.

There are a plurality of manners for performing the prompting. For example, the user may be prompted, on a display screen of the electronic device, to make the preparatory action before making the gesture action, or voice information sent by the electronic device may be used to prompt the user to make the preparatory action before making the gesture action.

Optionally, the method shown in FIG. 6 further includes: presenting preparatory action prompt information, where the preparatory action prompt information is used to prompt the user to make the preparatory action before making the gesture action.

The preparatory action prompt information may be prompt information in a text form, may be prompt information in a voice form, may be picture information, or may be information in combination with at least two of the three forms. For example, the preparatory action prompt information may include a corresponding text prompt and voice prompt.

The preparatory action prompt information may be presented by using a screen when including image and text information, the preparatory action may be presented by using a speaker when including voice information, or the preparatory action prompt information may be jointly presented by using the screen and the speaker when including both the image and text information and the voice information.

In this application, the user can be better prompted by using the preparatory action prompt information, so that the user makes the preparatory action before making the gesture action, thereby improving a gesture recognition effect to a specific extent, and improving user experience.

Optionally, before step 1001, the method shown in FIG. 6 further includes: obtaining preparatory action selection information of the user, and determining the preparatory action based on the preparatory action selection information.

The preparatory action selection information is used to indicate the preparatory action in step 1001.

In this application, the preparatory action is determined by using the preparatory action selection information of the user. Compared with a manner in which a uniform preparatory action is used, a proper preparatory action can be selected for the user based on an operation habit of the user, thereby improving user experience.

1002. Determine, based on the first image stream, whether the user makes a preparatory action.

The preparatory action may be a preparation action before the user makes the gesture action. Further, the preparatory action may be a habitual preparation action or a natural preparation action before the user makes the gesture action.

Specifically, the preparatory action may be a habitual preparation action or a natural preparation action before the user makes the gesture action (these specific gesture actions may be some specific actions capable of performing gesture interaction with an electronic device, for example, screen capturing, waving up, and waving down), rather than an action intentionally made.

The preparatory action may be specifically a hover or a pause in any gesture posture. For example, the preparatory action may be a hover or a pause when a hand is in an extended posture, may be a hover or a pause when a hand is in a fist clenching posture, or may be a hover or a pause when a hand is in a half-clenching posture.

The preparatory action may alternatively be a state in which four fingers (four fingers other than an index finger) of a hand curl up and the index finger stretches out, and the index finger taps or shakes in a small range.

Figure 8:
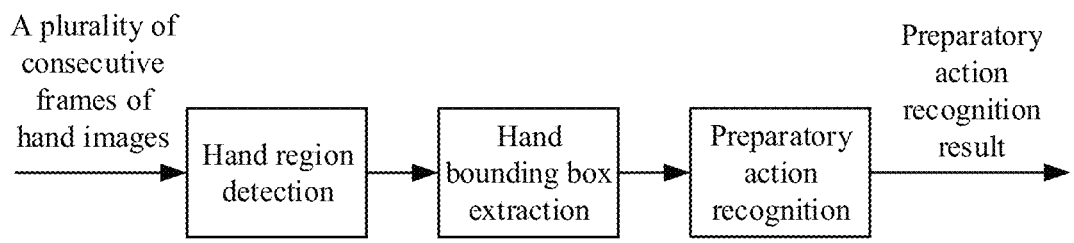
FIG. 8 is a schematic diagram of a preparatory action determining process.

When the preparatory action is a hover or a pause in any gesture posture, a process shown in FIG. 8 may be used to determine whether the user makes the preparatory action.

As shown in FIG. 8, after a plurality of consecutive frames of hand images are obtained, hand region detection may be performed on the plurality of consecutive frames of hand images. Then, a hand bounding box is extracted from each frame of hand image. Next, the preparatory action is further recognized based on the hand bounding boxes in the plurality of consecutive frames of hand images, and a preparatory action recognition result is output.

The hand bounding box in each frame of image may be a surrounding box surrounding the hand of the user in the frame of image, and the hand bounding box in each frame of image may be obtained by using a neural network model.

FIG. 8 only shows a general process of determining whether the user makes the preparatory action, and determining of whether the user makes the preparatory action is described below in detail with reference to FIG. 9.

Figure 9:
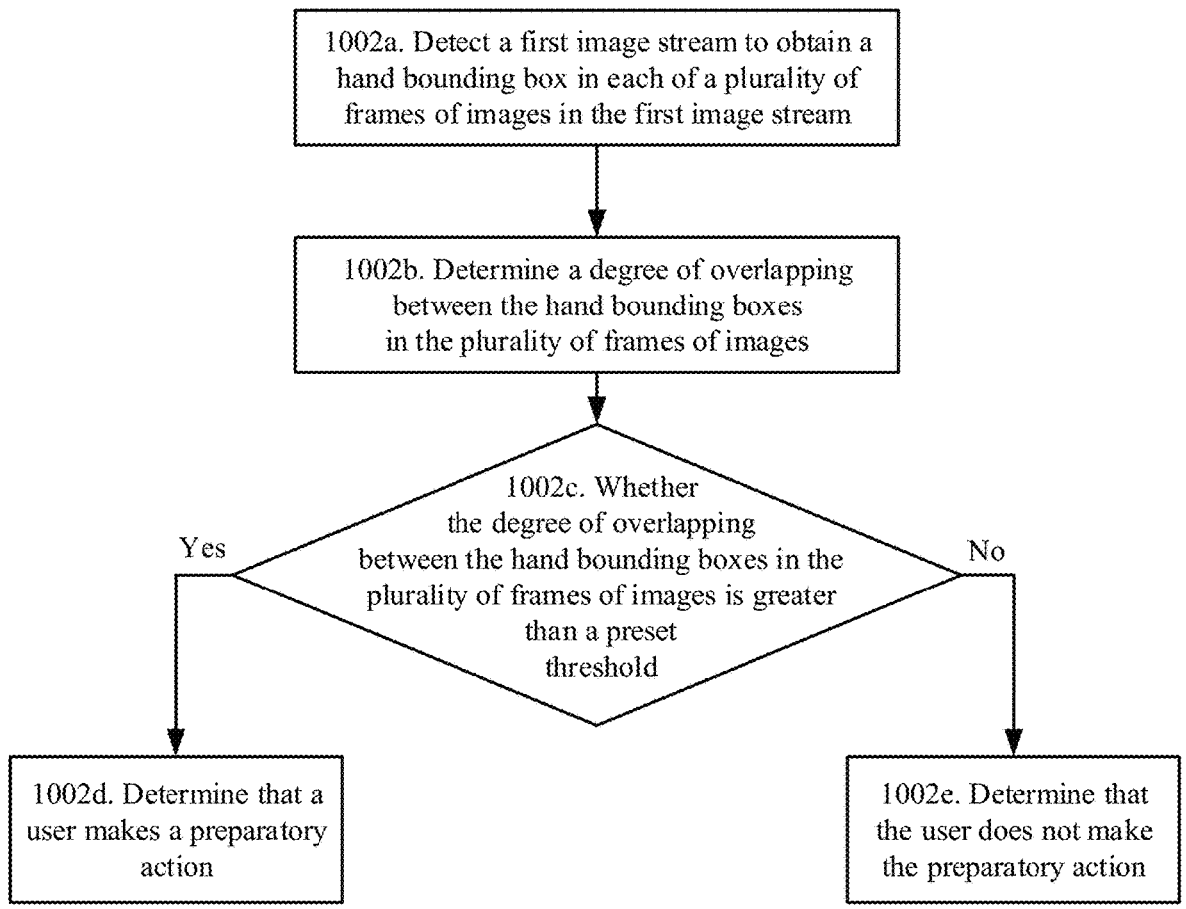
FIG. 9 is a schematic diagram of a process of determining whether a preparatory action occurs.

As shown in FIG. 9, step 1002 specifically includes step 1002a to step 1002e, and these steps are described below in detail.

1002a. Detect the first image stream to obtain a hand bounding box in each of the plurality of frames of images in the first image stream.

For example, the first image stream includes five frames of images. The five frames of images need to be separately detected in step 1002a to obtain a hand bounding box in each frame of image.

1002b. Determine a degree of overlapping between the hand bounding boxes in the plurality of frames of images.

1002c. Determine whether the degree of overlapping between the hand bounding boxes in the plurality of frames of images is greater than a preset threshold.

In step 1002c, when the degree of overlapping between the hand bounding boxes in the plurality of frames of images is greater than the preset threshold, step 1002d is performed to determine that the user makes the preparatory action. Alternatively, when the degree of overlapping between the hand bounding boxes in the plurality of frames of images is less than or equal to the preset threshold, step 1002e is performed to determine that the user does not make the preparatory action.

Step 1002d of determining whether the degree of overlapping between the hand bounding boxes in the plurality of frames of images is greater than the preset threshold may be specifically performed in any of the following two manners.

(1) It is determined whether a degree of overlapping between a hand bounding box in a first frame of image and a hand bounding box in a last frame of image is greater than the preset threshold.

(2) It is determined whether a degree of overlapping between a hand bounding box in an $i^{th}$ frame of image and a hand bounding box in a $j^{th}$ frame of image is greater than the preset threshold.

In Manner (2), the $i^{th}$ frame of image and the $j^{th}$ frame of image are two frames of images that are in the plurality of frames of images and whose image bounding boxes overlap at a minimum degree.

That the first image stream includes five frames of images is still used as an example. For Manner (1), whether a degree of overlapping between a hand bounding box in a first frame of image and a hand bounding box in a fifth frame of image is greater than the preset threshold needs to be determined. For Manner (2), it is assumed that in the five frames of images, a degree of overlapping between the hand bounding box in the first frame of image and a hand bounding box in a fourth frame of image is minimum. In this case, whether the degree of overlapping between the hand bounding box in the first frame of image and the hand bounding box in the fourth frame of image is greater than the preset threshold needs to be determined.

1002d. Determine that the user makes the preparatory action.

1002e. Determine that the user does not make the preparatory action.

In the process shown in FIG. 9, it is determined that the user makes the preparatory action when the degree of overlapping between the hand bounding boxes in the plurality of frames of images is greater than the preset threshold, and it is determined that the user does not make the preparatory action when the degree of overlapping between the hand bounding boxes in the plurality of frames of images is less than or equal to the preset threshold.

Optionally, in this application, it may be determined that the user makes the preparatory action when the degree of overlapping between the hand bounding boxes in the plurality of frames of images is greater than or equal to the preset threshold, and it may be determined that the user does not make the preparatory action when the degree of overlapping between the hand bounding boxes in the plurality of frames of images is less than the preset threshold.

When it is determined through the process shown in FIG. 9 that the user makes the preparatory action, steps 1003 to 1005 continue to be performed to recognize the gesture action; and when it is determined through the process shown in FIG. 9 that the user does not make the preparatory action, step 1006 is directly performed to stop gesture recognition.

A preparatory action recognition result is described below with reference to FIG. 10.

Figure 10:
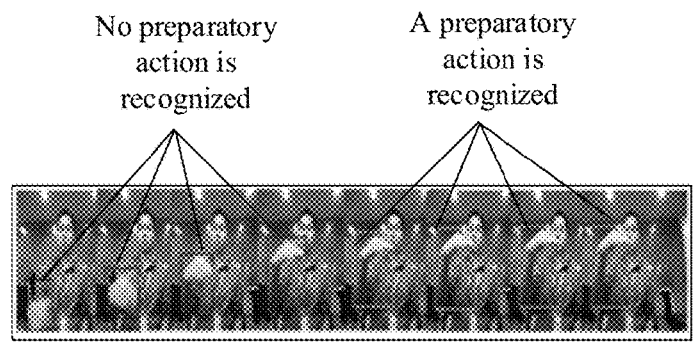
FIG. 10 is a schematic diagram of a preparatory action recognition process.

As shown in FIG. 10, in the first four frames of images, a location change of a hand bounding box is relatively large (a degree of overlapping between hand bounding boxes is greater than the preset threshold), and it is determined that the user does not make the preparatory action (that is, no preparatory action is recognized). However, in subsequent four frames of images, the location change of the hand bounding box is relatively small (a degree of overlapping between hand bounding boxes is less than or equal to the preset threshold), and it is determined that the user makes the preparatory action (that is, the preparatory action is recognized).

1003. Obtain a second image stream.

The second image stream includes a plurality of consecutive frames of hand images of the user.

It should be understood that time of obtaining the second image stream is later than time of obtaining the first image stream, the plurality of frames of hand images included in the second image stream are different from the plurality of frames of hand images included in the first image stream, and time corresponding to the plurality of frames of hand images included in the second image stream is later than time corresponding to the plurality of frames of hand images in the first image stream.

1004. Perform gesture recognition based on the second image stream to determine the gesture action of the user.

The gesture action in this embodiment of this application may be a mid-air gesture action, that is, the hand of the user has no physical contact with the electronic device when the user makes the gesture action.

1005. Respond to the gesture action of the user to implement gesture interaction with the user.

After the gesture action of the user is determined, gesture interaction with the user can be implemented based on operations corresponding to different gesture actions.

For example, when learning that the gesture action of the user is screen capturing, the electronic device may scale a currently displayed picture; and when learning that the gesture action of the user is paging up and down, the electronic device may page a currently displayed web page.

In this application, the preparatory action is determined before gesture recognition is formally performed, and gesture recognition is performed only when the user makes the preparatory action, so that a start state of the gesture action can be accurately recognized to avoid an erroneous response to gesture recognition as much as possible, thereby increasing an accuracy rate of gesture recognition, and enhancing gesture interaction experience of the user.

In step 1004, when gesture recognition is performed based on the second image stream, the gesture action of the user may be determined based on an existing gesture recognition solution. Specifically, a neural network model may be used to perform gesture recognition processing on the second image stream to obtain the gesture action of the user.

In addition, different gesture actions may be relatively similar to each other, or the user habitually makes some other gesture actions in a gesture action. Consequently, erroneous recognition of the gesture action is prone to occur in this case.

For example, the user habitually first makes an action of pushing a palm forward before making a screen capture action. However, when the action of pushing a palm forward is a predefined gesture action, it is possible to recognize only the action of pushing a palm forward as the gesture action of the user, which causes erroneous recognition of the gesture action.

Figure 11:
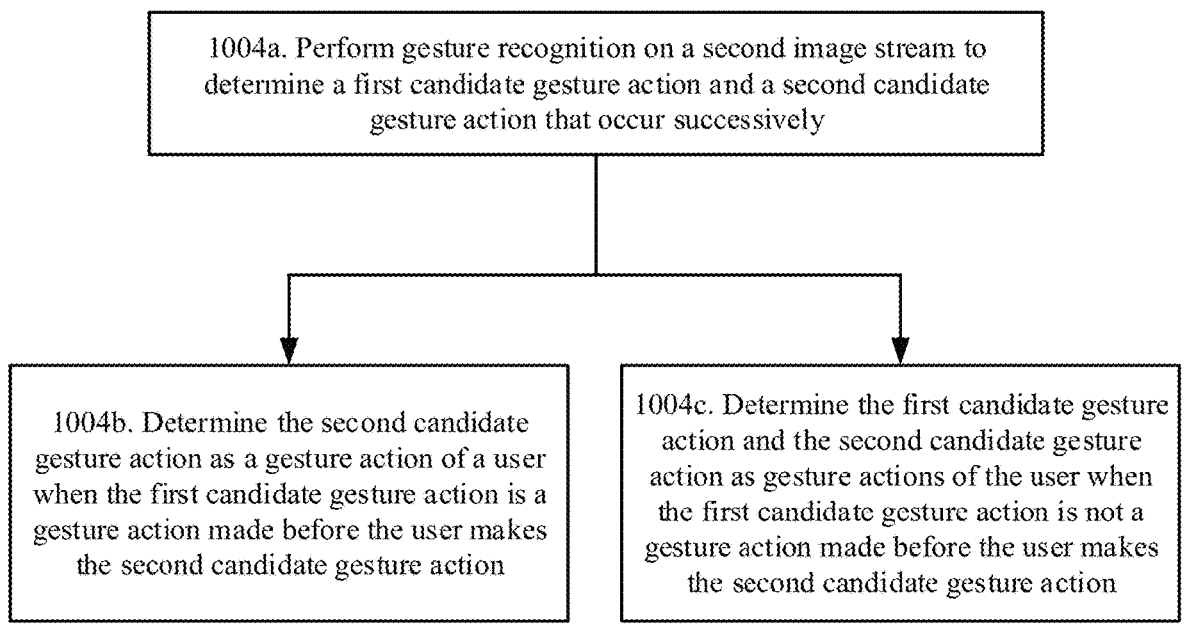
FIG. 11 is a schematic diagram of a process of performing gesture recognition based on a second image stream.

To avoid erroneous recognition of the gesture action as much as possible, when the gesture action of the user is determined in step 1004, the gesture action may be recognized by using a process shown in FIG. 11. The gesture recognition process in step 1004 is described below in detail with reference to FIG. 11.

FIG. 11 is a schematic flowchart of performing gesture recognition based on a second image stream. The process shown in FIG. 11 includes steps 1004a to 1004c, and the steps 1004a to 1004c are described below in detail.

1004a. Perform gesture recognition on the second image stream to determine a first candidate gesture action and a second candidate gesture action that occur successively.

In step 1004a, the first candidate gesture action occurs before the second candidate gesture action. In addition, a time interval between the first gesture action and the second gesture action is less than a preset time interval (for example, the preset time interval may be 0.3 seconds or another value ranging from 0 seconds to 1 second).

1004b. Determine the second candidate gesture action as the gesture action of the user when the first candidate gesture action is a gesture action made before the user makes the second candidate gesture action.

Specifically, in step 1004b, when the first candidate gesture action is a gesture action habitually made before the user makes the second candidate gesture action, the second candidate gesture action may be determined as the gesture action of the user.

When the first candidate gesture action is a gesture action habitually made before the user makes the second candidate gesture action, and the first candidate gesture action and the second candidate gesture action that occur successively are determined by performing gesture recognition based on the second image stream, the user is likely to make the second candidate gesture action, but due to a habit of the user, the user habitually makes the first candidate gesture before making the second gesture action. Therefore, the second candidate gesture action may be determined as the gesture action of the user in this case. In this way, erroneous recognition of the gesture action can be avoided to a specific extent.

1004c. Determine the first candidate gesture action and the second candidate gesture action as gesture actions of the user when the first candidate gesture action is not a gesture action habitually made before the user makes the second candidate gesture action.

Specifically, in step 1004c, when the first candidate gesture action is not a gesture action habitually made before the user makes the second candidate gesture action, the first candidate gesture action and the second candidate gesture action may be determined as the gesture actions of the user.

When the first candidate gesture is not a gesture action habitually made before the user makes the second candidate gesture action, the first candidate gesture action and the second candidate gesture action are likely to be two separate (independent) gesture actions. In this case, both the first candidate gesture action and the second candidate gesture action can be determined as the gesture actions of the user.

Generally, the gesture action of the user is relatively complex, and when making a gesture action, the user may habitually make another gesture action due to a personal habit, which may cause erroneous recognition of the gesture action. In this application, after two candidate gesture actions that occur consecutively are recognized, a specific candidate gesture action that is a gesture action really made by the user can be comprehensively determined based on an association relationship (whether a previous candidate gesture action is an action habitually made before the user makes a subsequent candidate gesture action) between the two candidate gesture actions.

In this application, when two candidate gesture actions that occur consecutively are recognized based on an image stream, a gesture action really made by the user may be comprehensively determined based on whether a previous candidate gesture action is a gesture action habitually made before the user makes a subsequent candidate gesture action, to avoid erroneous recognition of the gesture action to a specific extent, thereby increasing an accuracy rate of gesture action recognition.

Specifically, when the two candidate gesture actions that occur consecutively are recognized based on the image stream, the gesture action of the user may be determined from the first candidate gesture action and the second candidate gesture action based on whether the first candidate gesture action is a gesture action habitually made before the user makes the subsequent candidate gesture action, thereby increasing an accuracy rate of gesture action recognition.

Optionally, the second candidate gesture action is a screen capture action, and the first candidate gesture action is any of pushing forward, pushing backward, waving up, and waving down.

Generally, the user habitually makes any of the following actions before making the screen capture action: pushing forward, pushing backward, waving up, and waving down. Therefore, when two consecutive gesture actions are obtained by performing gesture recognition based on the second image stream, and a current gesture action is any of pushing forward, pushing backward, waving up, and waving down, and a subsequent gesture action is the screen capture action, the screen capture action may be determined as the gesture action of the user. This can present the screen capture action of the user from being affected by the actions of pushing forward, pushing backward, waving up, and waving down, thereby avoiding erroneous recognition of the gesture action.

Optionally, the second candidate gesture action is shaking left and right or shaking up and down, and the first candidate gesture action is any of pushing forward, pushing backward, waving up, and waving down.

For example, before shaking left and right, the user usually habitually pushes forward (or may push backward, waving up, and waving down). Therefore, when two consecutive gesture actions are obtained by performing gesture recognition based on the second image stream, and a first gesture action is pushing forward and a second gesture action is shaking left and right, shaking left and right may be determined as the gesture action of the user. In this way, the action of pushing forward can be prevented from affecting the action of shaking left and right of the user, thereby avoiding erroneous recognition of the gesture action.

A process of determining a result of a real gesture action of the user based on two consecutive candidate gesture actions recognized based on an image stream is described below with reference to FIG. 12.

Figure 12:
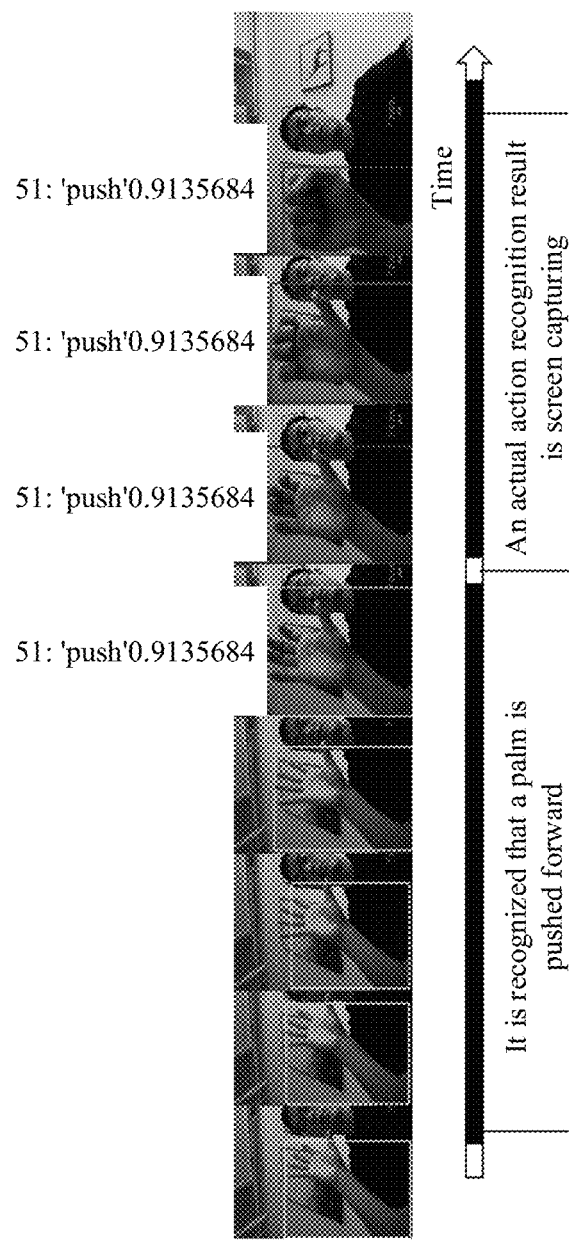
FIG. 12 is a schematic diagram of a process of performing gesture recognition based on a second image stream.

As shown in FIG. 12, it is recognized based on the first five frames of images that the user makes a gesture action of pushing a palm forward, and it is recognized based on subsequent three frames of images that the user makes a screen capture action. In other words, it is recognized based on an image stream that the user consecutively makes the gesture actions of pushing the palm forward and screen capturing. However, the user habitually pushes the palm forward before making the screen capture action. Therefore, it can be determined that a real gesture action of the user is screen capturing, that is, an actual action recognition result is screen capturing.

When gesture recognition is performed based on the second image stream in step 1004, dynamic gesture information and static gesture information may be further obtained based on the second image stream, and then the gesture action of the user is comprehensively determined based on the dynamic gesture information and the static gesture information.

The dynamic gesture information may be a candidate gesture action obtained by performing gesture recognition on the second image stream, and the static gesture information may be a hand posture type of the user obtained by performing gesture posture recognition on one of the first several frames of images in the second image stream.

Figure 13:
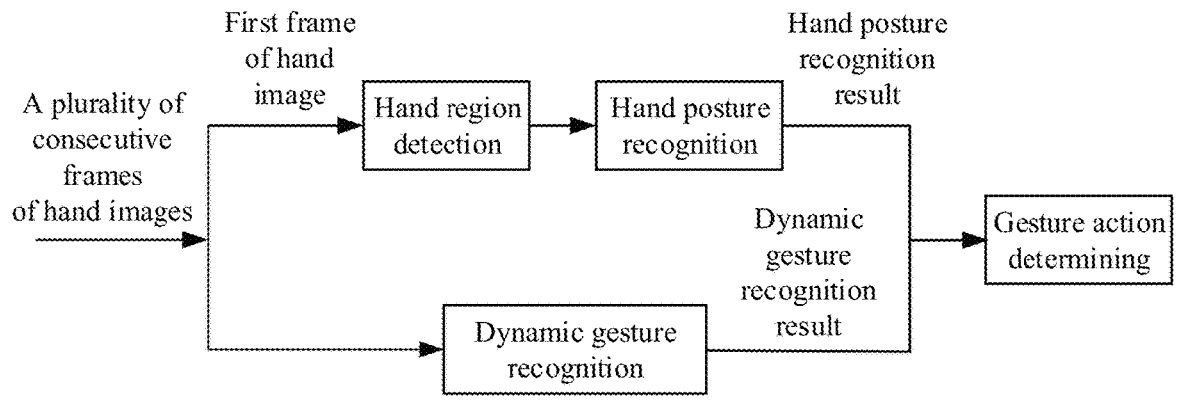
FIG. 13 is a schematic diagram of a process of performing gesture recognition based on a second image stream.

Specifically, gesture recognition may be performed by using a process shown in FIG. 13.

As shown in FIG. 13, after the plurality of consecutive frames of hand images in the second image stream are obtained, a first frame of hand image may be extracted from the plurality of consecutive frames of hand images, and then hand region detection and hand region recognition are performed on the first frame of hand image to determine a hand posture recognition result. In addition, dynamic gesture recognition may be directly performed on the plurality of consecutive frames of hand images to obtain a dynamic gesture recognition result, and then the gesture action of the user is comprehensively determined based on the hand posture recognition result and the dynamic gesture recognition result.

Figure 14:
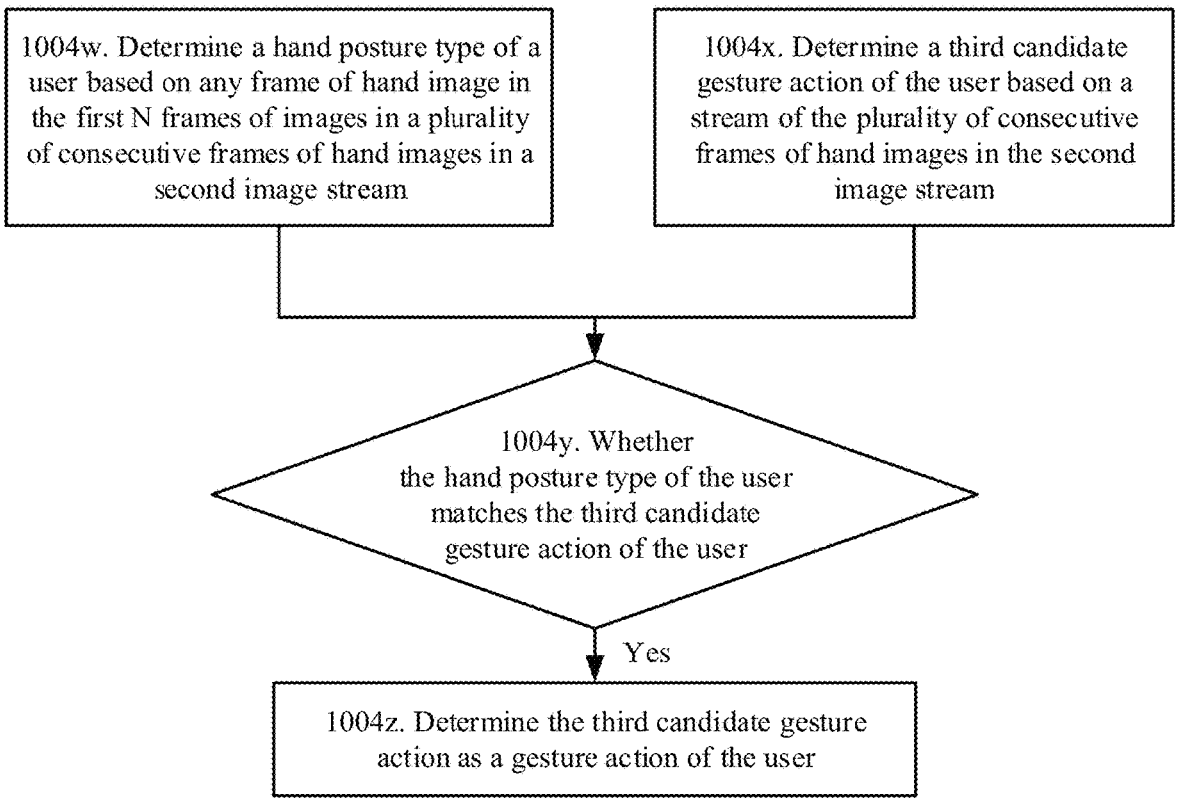
FIG. 14 is a schematic diagram of a process of performing gesture recognition based on a second image stream.

FIG. 14 is a flowchart of performing gesture recognition based on a second image stream. The process shown in FIG. 14 includes step 1004w to step 1004z. The following describes these steps in detail.

1004w. Determine a hand posture type of the user based on any frame of hand image in the first N frames of images in the plurality of consecutive frames of hand images in the second image stream.

N is a positive integer. Generally, a value of N may be 1, 3, 5, or the like.

In step 1004w, the hand posture type of the user may be directly determined based on a first frame of hand image in the plurality of consecutive frames of hand images in the second image stream.

1004x. Determine a third candidate gesture action of the user based on a stream of the plurality of consecutive frames of hand images in the second image stream.

1004y. Determine whether the hand posture type of the user matches the third candidate gesture action.

Specifically, in step 1004y, it may be determined, based on a preset matching rule, whether the hand posture type of the user matches the third candidate gesture action.

The matching rule may mean that the hand posture type of the user needs to match the gesture action of the user, and the matching rule may be preset.

In step 1004y, when the hand posture type of the user is placed horizontally and the third candidate gesture action is paging up and down, it may be determined that the hand posture type of the user matches the third candidate gesture action; and when the hand posture type of the user is placed vertically and the third candidate gesture action is paging left and right, it may be determined that the hand posture type of the user matches the third candidate gesture action of the user.

1004z. Determine the third candidate gesture action as the gesture action of the user when the hand posture type of the user matches the third candidate gesture action.

It should be understood that when the hand posture type of the user does not match the third candidate gesture action, an image stream may continue to be obtained to continuously perform gesture recognition.

In this application, whether a hand posture of the user matches the gesture action of the user is determined, so that a gesture action matching the hand posture of the user can be determined as the gesture action of the user, to avoid erroneous gesture recognition to a specific extent, thereby increasing an accuracy rate of gesture recognition.

To describe an effect of gesture recognition performed in the solution of this application, a gesture recognition effect of the gesture recognition method in the embodiments of this application is tested below by using a data set. The data set includes about 292 short videos, and each short video includes a dynamic gesture. Gesture types include four actions: waving up, waving down, pushing a palm forward, and screen capturing.

When the gesture recognition method in the embodiments of this application is tested by using the data set, the following description is provided to a user in advance: The user may briefly pause before making a gesture action. However, it is not forcibly required that the user necessarily briefly pauses before making a gesture, and a case in which the user does not briefly pause before making the gesture action is not filtered out after the test. In this way, when the data set is collected, naturalness of making the gesture action by the user is maintained.

In a test process, a same hand region detection model (which is mainly configured to recognize that a hand region of the user reaches a hand image) and dynamic gesture recognition model (which is mainly configured to determine a gesture action of the user based on an obtained image stream) are used to recognize a tested video.

To evaluate a gesture recognition effect of the gesture recognition method in the embodiments of this application, a preparatory action determining module (which is mainly configured to determine whether the user makes a preparatory action), a gesture information merging module (which may be configured to perform the gesture recognition process shown in FIG. 14), and an erroneous gesture recognition determining module (which may be configured to perform the gesture recognition process shown in FIG. 11) proposed in the embodiments of this application are not used in a first test procedure, and a test result of the first test procedure is shown in Table 1.

TABLE 1

| Test set | Recall rate | Accuracy |
|---|---|---|
| 0 | 0.727 | 0.875 |
| 1 | 0.5 | 0.898 |
| 2 | 0.727 | 0.299 |
| 3 | 0.554 | 0.878 |

However, in a second test procedure, the preparatory action determining module, the gesture information merging module, and the erroneous gesture recognition determining module are used for testing, and a test effect of the second test procedure is shown in Table 2.

TABLE 2

| Test set | Recall rate | Accuracy |
|---|---|---|
| 0 | 0.883 | 0.872 |
| 1 | 0.792 | 0.966 |
| 2 | 0.864 | 0.844 |
| 3 | 0.785 | 0.927 |

It can be learned from Table 1 and Table 2 that the recall rate and the accuracy rate in Table 2 are generally greater than the recall rate and the accuracy rate in Table 1. To more intuitively find, through comparison, a difference between the recall rates and between the accuracy rates in the first test procedure and the second test procedure, the test results in Table 1 and Table 2 are averaged herein, and an obtained result is shown in Table 3.

TABLE 3

| Test process | Recall rate | Accuracy |
|---|---|---|
| First test procedure | 0.627 | 0.738 |
| Second test procedure | 0.831 | 0.902 |

It can be learned from Table 3 that the recall rate and the accuracy rate in the second test flow are much greater than the recall rate and the accuracy rate in the first test procedure, that is, gesture recognition performed by using the gesture recognition method in the embodiments of this application has a good gesture recognition effect.

The gesture recognition method in the embodiments of this application is described above in detail with reference to the accompanying drawings, and an electronic device in the embodiments of this application is described below. It should be understood that the electronic device in the embodiments of this application can perform the steps of the gesture recognition method in this application, and repeated descriptions are properly omitted when the electronic device in the embodiments of this application is described below.

Figure 15:
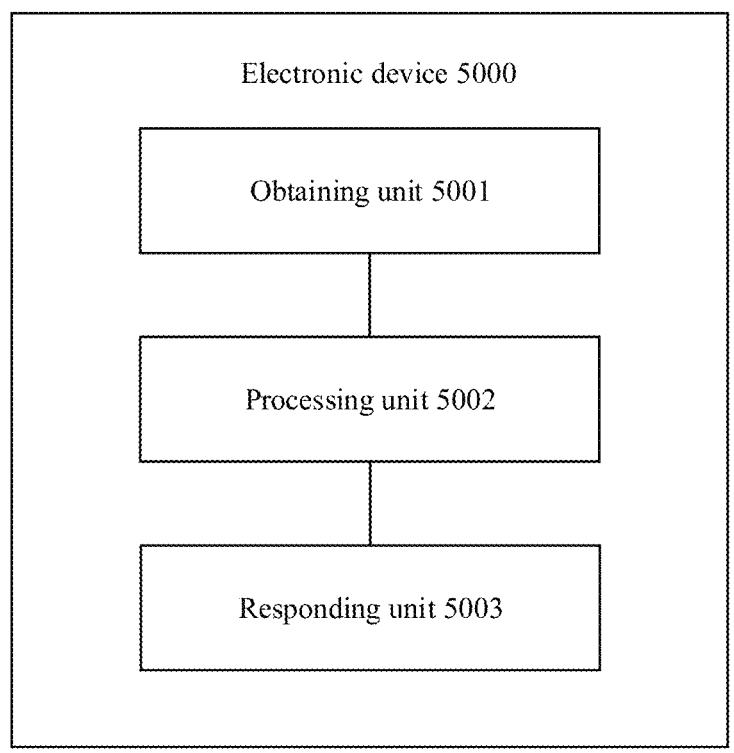
FIG. 15 is a schematic block diagram of an electronic device according to an embodiment of this application.

FIG. 15 is a schematic block diagram of an electronic device according to an embodiment of this application.

An electronic device 5000 shown in FIG. 15 includes an obtaining unit 5001, a processing unit 5002, and a responding unit 5003. The obtaining unit 5001 may be configured to perform step 1001 and step 1003 in the method shown in FIG. 6, the processing unit 5002 may be configured to perform step 1002, step 1004, and step 1006 in the method shown in FIG. 6, and the responding unit 5003 may be configured to perform step 1005 in the method shown in FIG. 6.

In this application, the electronic device determines a preparatory action before formally performing gesture recognition, and the electronic device performs gesture recognition only when a user makes the preparatory action, so that the electronic device can accurately recognize a start state of a gesture action to avoid an erroneous response to gesture recognition as much as possible, thereby increasing an accuracy rate of gesture recognition, and enhancing gesture interaction experience of the user.

In this application, when the electronic device is used to perform gesture recognition, the electronic device may further prompt the user to make the preparatory action before making the gesture action. Therefore, the electronic device may further include a prompt unit.

Figure 16:
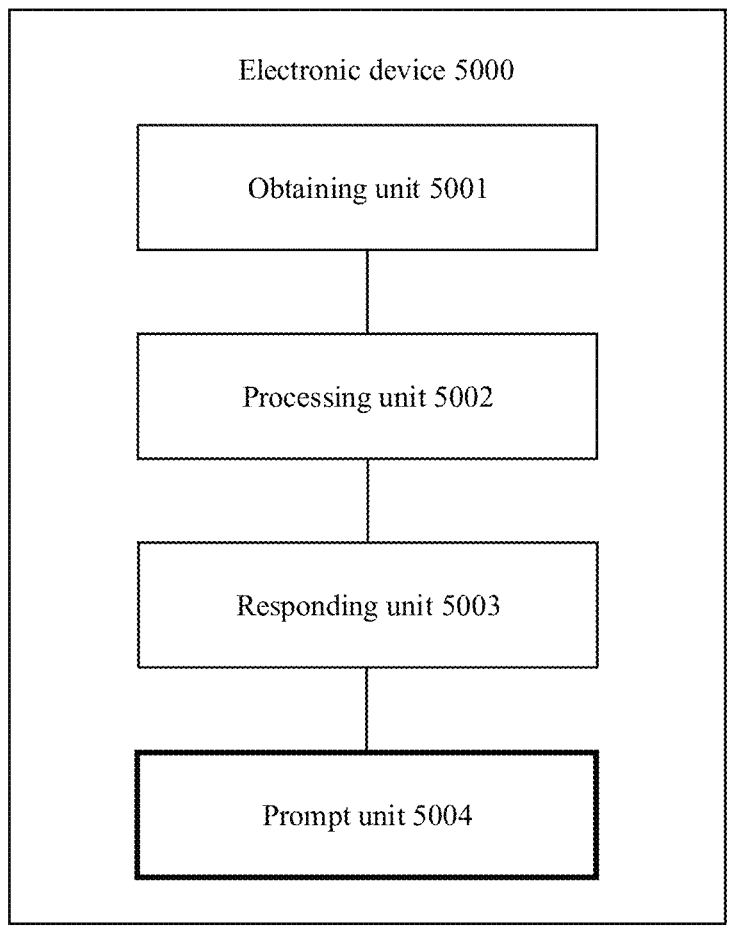
FIG. 16 is a schematic block diagram of an electronic device according to an embodiment of this application.

As shown in FIG. 16, the electronic device 5000 may further include a prompt unit 5004, and the prompt unit 5004 is configured to prompt the user to make the preparatory action before making the gesture action.

In this application, the prompt unit 5004 prompts the user to make the preparatory action before making the gesture action, so that the user can be prevented from forgetting to make the preparatory action in advance when gesture recognition is performed, thereby improving a gesture recognition effect to a specific extent, and improving interaction experience of the user.

Figure 17:
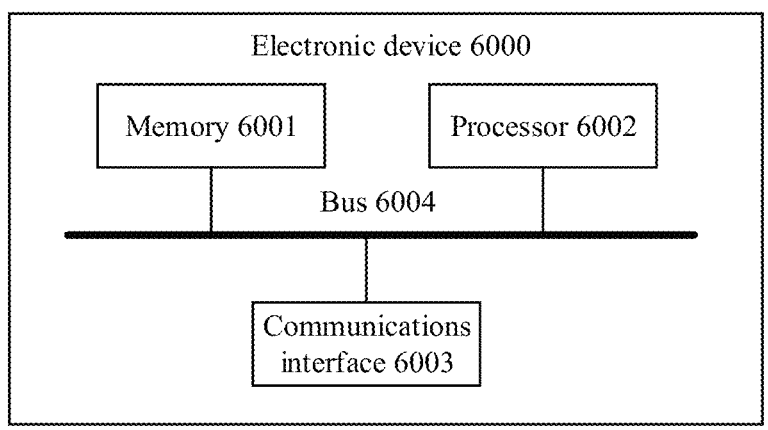
FIG. 17 is a schematic block diagram of an electronic device according to an embodiment of this application.

FIG. 17 is a schematic diagram of a structure of an electronic device according to an embodiment of this application. An electronic device 6000 shown in FIG. 17 includes a memory 6001, a processor 6002, a communications interface 6003, and a bus 6004. Communications connections between the memory 6001, the processor 6002, and the communications interface 6003 are implemented through the bus 6004.

It should be understood that the obtaining unit in the electronic device 5000 may be equivalent to a camera (the camera is not shown in FIG. 17) in the electronic device 6000, and the processing unit 5002 and the responding unit 5003 may be equivalent to the processor 6002 in the electronic device 6000. Modules and units in the electronic device 6000 are described below in detail.

The memory 6001 may be a read-only memory (read only memory, ROM), a static storage device, a dynamic storage device, or a random access memory (random access memory, RAM). The memory 6001 may store a program, and when the program stored in the memory 6001 is executed by the processor 6002, the processor 6002 is configured to perform the steps of the gesture recognition method in the embodiments of this application.

Specifically, the processor 6002 may be configured to perform step 1001 to step 1005 in the method shown in FIG. 6. In addition, the processor 6002 may further perform the processes shown in FIG. 9, FIG. 11, and FIG. 14.

When the processor 6002 performs step 1001 to step 1005, the processor 6002 may obtain a first image stream from a camera (the camera is not shown in FIG. 17) in the electronic device 6000 through the communications interface 6003; determine a preparatory action based on the first image stream; and when a user makes the preparatory action, obtain a second image stream by using the camera in the electronic device 6000, and perform gesture recognition based on the second image stream.

The processor 6002 may be a general-purpose central processing unit (central processing unit, CPU), a microprocessor, an application-specific integrated circuit (application-specific integrated circuit, ASIC), a graphics processing unit (graphics processing unit, GPU), or one or more integrated circuits, and is configured to execute a related program, to implement the gesture recognition method in the embodiments of this application.

The processor 6002 may be an integrated circuit chip and has a signal processing capability. In an implementation process, steps of the gesture recognition method in this application may be implemented through an integrated logic circuit of hardware in the processor 6002 or an instruction in a form of software.

The processor 6002 may alternatively be a general-purpose processor, a digital signal processor (digital signal processor, DSP), an application-specific integrated circuit (ASIC), a field programmable gate array (field programmable gate array, FPGA) or another programmable logic device, a discrete gate or transistor logic device, or a discrete hardware component. The methods, the steps, and logic block diagrams that are disclosed in the embodiments of this application may be implemented or performed. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 6001. The processor 6002 reads information in the memory 6001, and completes, in combination with hardware of the processor 6002, a function that needs to be performed by the unit included in the electronic device, or performs the gesture recognition method in the method embodiment of this application.

The communications interface 6003 uses a transceiver apparatus, for example, but not limited to, a transceiver, to implement communication between the apparatus 6000 and another device or a communications network. For example, a to-be-processed image may be obtained through the communications interface 6003.

The bus 6004 may include a path for transmitting information between components (for example, the memory 6001, the processor 6002, and the communications interface 6003) of the apparatus 6000.

Figure 18:
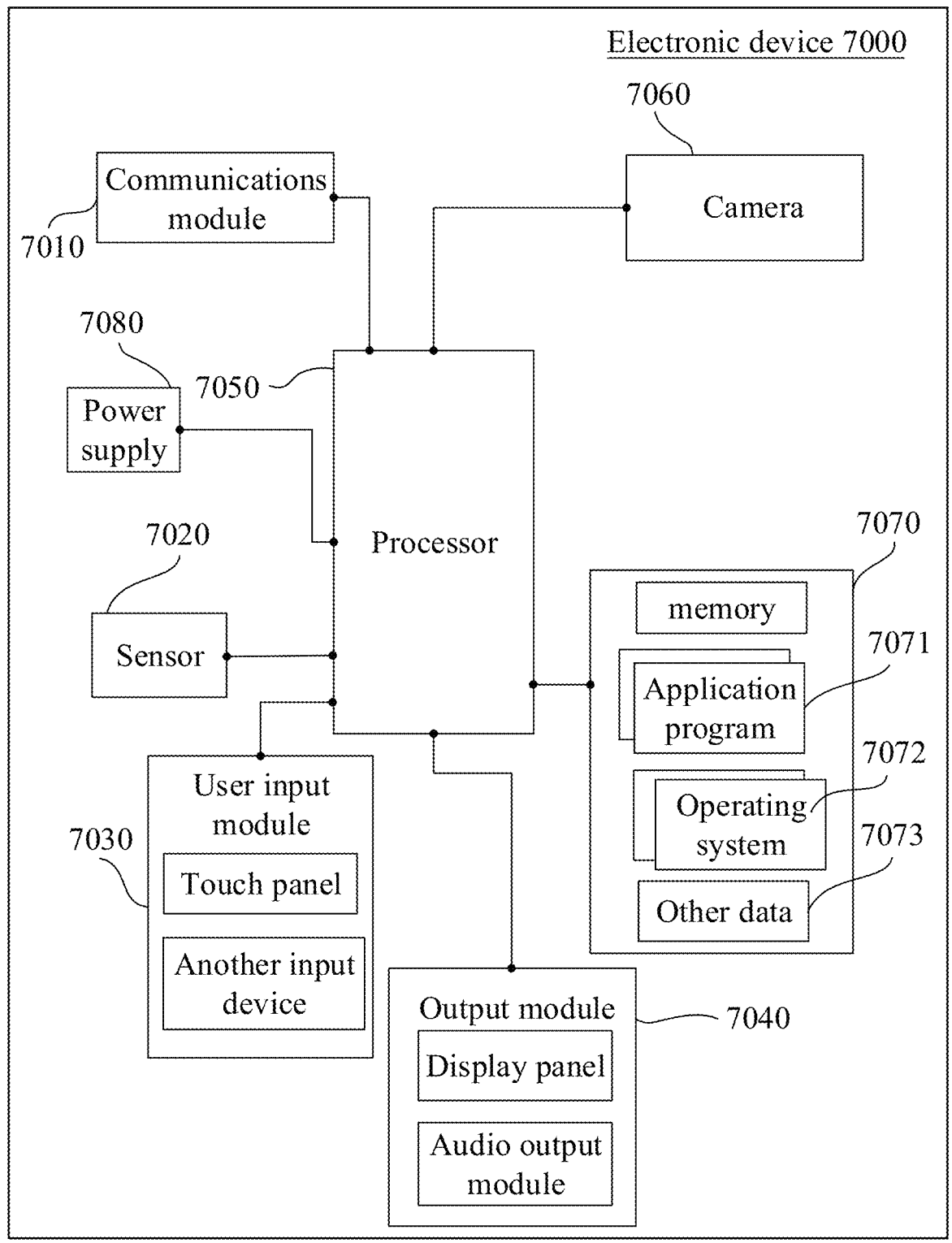
FIG. 18 is a schematic diagram of a hardware structure of an electronic device according to an embodiment of this application.

FIG. 18 is a schematic diagram of a hardware structure of an electronic device according to an embodiment of this application. An electronic device 7000 shown in FIG. 18 can perform the gesture recognition method in the embodiments of this application. Specifically, the electronic device shown in FIG. 18 may perform the steps of the gesture recognition method shown in FIG. 6.

Specifically, the electronic device 7000 may obtain a first image stream by using a camera 7060 (the camera 7060 may perform step 1001); next, may process the first image stream by using a processor to determine whether a user makes a preparatory action (the process corresponds to step 1002); stop gesture recognition if the user does not make the preparatory action (the process corresponds to step 1006); obtain a second image stream by using the camera 7060 again if the user makes the preparatory action (the process corresponds to step 1003), and then perform gesture recognition by using the second image stream (the process corresponds to step 1004); and respond to a gesture action of the user after determining the gesture action of the user, to implement gesture interaction with the user (the process corresponds to step 1005).

In addition, the processor in the electronic device 7000 may further perform steps 1002*a* to 1002*e* in the process shown in FIG. 9 to determine whether the user makes the preparatory action.

The processor in the electronic device 7000 may further perform the process including 1004*a* to 1004*c* shown in FIG. 11, to perform gesture recognition based on the second image stream.

The processor in the electronic device 7000 may further perform the process including 1004*w* to 1004*z* shown in FIG. 14, to perform gesture recognition based on the second image stream.

A specific structure of the electronic device 7000 shown in FIG. 18 is described below in detail.

The electronic device shown in FIG. 18 includes a communications module 7010, a sensor 7020, a user input module 7030, an output module 7040, a processor 7050, the camera 7060, a memory 7070, and a power supply 7080. The following describes these modules in detail.

The communications module 7010 may include at least one module that can enable the electronic device 7000 to communicate with another device (for example, a cloud device). For example, the communications module 7010 may include one or more of a wired network interface, a broadcast receiving module, a mobile communications module, a wireless internet module, a local area communications module, or a position (or positioning) information module.

The sensor 7020 may sense some operations of a user, and the sensor 7020 may include a distance sensor, a touch sensor, and the like. The sensor 7020 may sense an operation such as touching a screen or approaching a screen by the user.

The user input module 7030 is configured to: receive entered digital information or character information or a contact touch operation/contactless gesture, and receive signal input related to user settings and function control of the system, and the like. The user input module 7030 includes a touch panel and/or another input device.

The output module 7040 includes a display panel, configured to display information entered by the user, information provided for the user, various menu interfaces of the system, or the like.

Optionally, the display panel may be configured in a form of a liquid crystal display (liquid crystal display, LCD), an organic light-emitting diode (organic light-emitting diode, OLED), or the like. In some other embodiments, the touch panel may cover the display panel, to form a touch display screen. In addition, the output module 7040 may further include an audio output module, an alarm, a tactile module, and the like.

In this application, the output module 7040 may be configured to prompt a user to make a preparatory action before making a gesture action.

Specifically, the output module 7040 may present preparatory action prompt information to prompt the user to make the preparatory action before making the gesture action.

When the preparatory action prompt information includes image and text information, the preparatory action prompt information may be presented by using the display panel in the output module 7040. When the preparatory action includes voice information, the preparatory action prompt information may be presented by using the audio output module in the output module 7040. When the preparatory action prompt information includes both the image and text information and the voice information, the preparatory action prompt information may be jointly presented by using the display panel and the audio output module in the output module 7040.

The camera 7060 is configured to photograph an image, and an image stream photographed by the camera 7060 may be sent to the processor to determine the preparatory action. When the preparatory action occurs, the camera 7060 may continue to obtain an image stream and send the image stream to the processor to perform gesture recognition.

The power supply 7080 may receive external power and internal power under control of the processor 7050, and provide power required for running the modules in the electronic device.

The processor 7050 may include one or more processors. For example, the processor 7050 may include one or more central processing units, or may include a central processing unit and a graphics processing unit, or may include an application processor and a coprocessor (for example, a micro control unit or a neural network processor). When the processor 7050 includes a plurality of processors, the plurality of processors may be integrated into a same chip, or may be independent chips. One processor may include one or more physical cores, and the physical core is a minimum processing module.

The memory 7070 may be configured to store a computer program, and the computer program includes an application program 7071, an operating system 7072, and the like. For example, a typical operating system is a system, such as Windows of Microsoft or MacOS of Apple, used for a desktop computer or a notebook computer; or a system, such as a Linux®-based Android (Android®) system developed by Google, used for a mobile terminal. When the gesture recognition method in the embodiments of this application is implemented through software, it may be considered that the gesture recognition method is specifically implemented by using the application program 7071.

The memory 7070 may include one or more of the following types: a flash (flash) memory, a memory of a hard disk type, a memory of a micro multimedia card type, a card-type memory, a random access memory (random access memory, RAM), a static random access memory (static RAM, SRAM), a read-only memory (read only memory, ROM), an electrically erasable programmable read-only memory (electrically erasable programmable read-only memory, EEPROM), a programmable read-only memory (programmable ROM, PROM), a magnetic memory, a magnetic disk, or an optical disc. In some other embodiments, the memory 7070 may be a network storage device in the Internet. The system may perform an update operation, a read operation, or another operation on the memory 7070 in the Internet.

The processor 7050 is configured to: read the computer program from the memory 7070, and then perform a method defined by the computer program. For example, the processor 7050 reads the operating system 7072, to run an operating system in the system and implement various functions of the operating system, or reads one or more application programs 7071, to run an application in the system.

For example, the memory 7070 may store a computer program (the computer program is a program corresponding to the gesture recognition method in the embodiments of this application). When the processor 7050 executes the computer program, the processor 7050 can perform the gesture recognition method in the embodiments of this application.

The memory 7070 further stores other data 7073 in addition to the computer program.

It should be understood that the obtaining unit in the electronic device 5000 may be equivalent to the camera 7060 in the electronic device 7000, and the processing unit 5002 and the responding unit 5003 may be equivalent to the processor 7050 in the electronic device 7000.

In addition, a connection relationship between the modules in FIG. 18 is merely an example. The modules in FIG. 18 may alternatively be another connection relationship. For example, all modules in the electronic device are connected through a bus.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium that can store program code such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A gesture recognition method, comprising:
   obtaining a first image stream, wherein the first image stream comprises a plurality of consecutive frames of images of a hand of a user;
   determining, based on the first image stream, that the user makes a preparatory action, wherein the preparatory action is a preparation action before the user makes a gesture action, and wherein determining, based on the first image stream, that the user makes the preparatory action comprises:
      detecting the first image stream to obtain a hand bounding box in each of the plurality of consecutive frames of images in the first image stream, wherein the hand bounding box in each frame of image is a surrounding box surrounding a hand of the user in the frame of image; and
      in response to determining that a degree of overlapping between the hand bounding boxes in the plurality of consecutive frames of images is greater than a preset threshold, determining that the user makes the preparatory action;
   obtaining a second image stream in response to the user making the preparatory action, wherein the second image stream comprises a plurality of consecutive frames of images of the hand of the user;
   performing gesture recognition based on the second image stream to determine the gesture action of the user; and
   responding to the gesture action of the user to implement gesture interaction with the user.

2. The method according to claim 1, wherein the performing gesture recognition based on the second image stream to determine the gesture action of the user comprises:
   performing gesture recognition on the second image stream to determine a first candidate gesture action and a second candidate gesture action that occur successively, wherein the first candidate gesture action is a gesture action made before the user makes the second candidate gesture action; and
   determining the second candidate gesture action as the gesture action of the user.

3. The method according to claim 2, wherein the second candidate gesture action is a screen capture action, and the first candidate gesture action is any of pushing forward, pushing backward, waving up, or waving down.

4. The method according to claim 1, wherein the performing gesture recognition based on the second image stream to determine the gesture action of the user comprises:
determining a hand posture type of the user based on any frame of hand image in first N frames of images in the plurality of consecutive frames of hand images in the second image stream, wherein N is a positive integer;
determining a candidate gesture action of the user based on a stream of the plurality of consecutive frames of hand images in the second image stream;
determining, based on a preset matching rule, whether the hand posture type of the user matches the candidate gesture action; and
in response to determining that the hand posture type of the user matches the candidate gesture action, determining the candidate gesture action as the gesture action of the user.

5. The method according to claim 4, wherein the determining, based on a preset rule, whether the hand posture type of the user matches the candidate gesture action of the user comprises:
in response to determining that the hand posture type of the user is placed horizontally and the candidate gesture action is paging up and down, determining that the hand posture type of the user matches the candidate gesture action; and
in response to determining that the hand posture type of the user is placed vertically and the candidate gesture action is paging left and right, determining that the hand posture type of the user matches the candidate gesture action of the user.

6. The method according to claim 1, wherein the preparatory action is a hover in any gesture posture.

7. The method according to claim 1, wherein the method further comprises:
prompting the user to make the preparatory action before making the gesture action.

8. An electronic device, comprising at least one processor, and one or more memories coupled to the at least one processor, wherein the one or more memories store programming instructions, and when executing the programming instructions stored in the one or more memories, the at least one processor executes gesture recognition operations comprising:
obtaining a first image stream, wherein the first image stream comprises a plurality of consecutive frames of images of a hand of a user;
determining, based on the first image stream, that the user makes a preparatory action, wherein the preparatory action is a preparation action before the user makes a gesture action, and wherein determining, based on the first image stream, that the user makes the preparatory action comprises:
detecting the first image stream to obtain a hand bounding box in each of the plurality of consecutive frames of images in the first image stream, wherein the hand bounding box in each frame of image is a surrounding box surrounding a hand of the user in the frame of image; and
in response to determining that a degree of overlapping between the hand bounding boxes in the plurality of consecutive frames of images is greater than a preset threshold, determining that the user makes the preparatory action;

obtaining a second image stream in response to the user making the preparatory action, wherein the second image stream comprises a plurality of consecutive frames of images of the hand of the user;
performing gesture recognition based on the second image stream to determine the gesture action of the user; and
responding to the gesture action of the user to implement gesture interaction with the user.

9. The electronic device according claim 8, wherein the performing gesture recognition based on the second image stream to determine the gesture action of the user comprises:
performing gesture recognition on the second image stream to determine a first candidate gesture action and a second candidate gesture action that occur successively, wherein the first candidate gesture action is a gesture action made before the user makes the second candidate gesture action; and
determining the second candidate gesture action as the gesture action of the user.

10. The electronic device according claim 9, wherein the second candidate gesture action is a screen capture action, and the first candidate gesture action is any of pushing forward, pushing backward, waving up, or waving down.

11. The electronic device according claim 8, wherein the performing gesture recognition based on the second image stream to determine the gesture action of the user comprises:
determining a hand posture type of the user based on any frame of hand image in first N frames of images in the plurality of consecutive frames of hand images in the second image stream, wherein N is a positive integer;
determining a candidate gesture action of the user based on a stream of the plurality of consecutive frames of hand images in the second image stream;
determining, based on a preset matching rule, whether the hand posture type of the user matches the candidate gesture action; and
in response to determining that the hand posture type of the user matches the candidate gesture action, determining the candidate gesture action as the gesture action of the user.

12. The electronic device according claim 11, wherein the determining, based on a preset rule, whether the hand posture type of the user matches the candidate gesture action of the user comprises:
in response to determining that the hand posture type of the user is placed horizontally and the candidate gesture action is paging up and down, determining that the hand posture type of the user matches the candidate gesture action; and
in response to determining that the hand posture type of the user is placed vertically and the candidate gesture action is paging left and right, determining that the hand posture type of the user matches the candidate gesture action of the user.

13. The electronic device according claim 8, wherein the preparatory action is a hover in any gesture posture.

14. The electronic device according claim 8, further comprises:
prompting the user to make the preparatory action before making the gesture action.

15. A non-transitory computer-readable storage medium storing one or more programming instructions executable by at least one processor to perform operations comprising:
obtaining a first image stream, wherein the first image stream comprises a plurality of consecutive frames of images of a hand of a user;

determining, based on the first image stream, that the user makes a preparatory action, wherein the preparatory action is a preparation action before the user makes a gesture action, and wherein determining, based on the first image stream, that the user makes the preparatory action comprises:
  detecting the first image stream to obtain a hand bounding box in each of the plurality of consecutive frames of images in the first image stream, wherein the hand bounding box in each frame of image is a surrounding box surrounding a hand of the user in the frame of image; and
  in response to determining that a degree of overlapping between the hand bounding boxes in the plurality of consecutive frames of images is greater than a preset threshold, determining that the user makes the preparatory action;
obtaining a second image stream in response to the user making the preparatory action, wherein the second image stream comprises a plurality of consecutive frames of images of the hand of the user;
performing gesture recognition based on the second image stream to determine the gesture action of the user; and
responding to the gesture action of the user to implement gesture interaction with the user.

16. The non-transitory computer-readable storage medium according to claim 15, wherein the performing gesture recognition based on the second image stream to determine the gesture action of the user comprises:
  performing gesture recognition on the second image stream to determine a first candidate gesture action and a second candidate gesture action that occur successively, wherein the first candidate gesture action is a gesture action made before the user makes the second candidate gesture action; and
  determining the second candidate gesture action as the gesture action of the user.

17. The non-transitory computer-readable storage medium according to claim 16, wherein the second candidate gesture action is a screen capture action, and the first candidate gesture action is any of pushing forward, pushing backward, waving up, or waving down.

18. The non-transitory computer-readable storage medium according to claim 15, wherein the performing gesture recognition based on the second image stream to determine the gesture action of the user comprises:
  determining a hand posture type of the user based on any frame of hand image in first N frames of images in the plurality of consecutive frames of hand images in the second image stream, wherein N is a positive integer;
  determining a candidate gesture action of the user based on a stream of the plurality of consecutive frames of hand images in the second image stream;
  determining, based on a preset matching rule, whether the hand posture type of the user matches the candidate gesture action; and
  in response to determining that the hand posture type of the user matches the candidate gesture action, determining the candidate gesture action as the gesture action of the user.

* * * * *

UNITED STATES PATENT AND TRADEMARK OFFICE
CERTIFICATE OF CORRECTION

| | | |
|---|---|---|
| PATENT NO. | : 12,210,687 B2 | Page 1 of 1 |
| APPLICATION NO. | : 17/689630 | |
| DATED | : January 28, 2025 | |
| INVENTOR(S) | : Xiaofei Wu et al. | |

It is certified that error appears in the above-identified patent and that said Letters Patent is hereby corrected as shown below:

In the Claims

In Column 32, In Line 10, In Claim 9, after "according" insert -- to --.

In Column 32, In Line 21, In Claim 10, after "according" insert -- to --.

In Column 32, In Line 25, In Claim 11, after "according" insert -- to --.

In Column 32, In Line 42, In Claim 12, after "according" insert -- to --.

In Column 32, In Line 56, In Claim 13, after "according" insert -- to --.

In Column 32, In Line 58, In Claim 14, after "according" insert -- to --.

Signed and Sealed this
Twenty-second Day of April, 2025

Coke Morgan Stewart
*Acting Director of the United States Patent and Trademark Office*